United States Patent
Lin et al.

(10) Patent No.: US 11,736,716 B2
(45) Date of Patent: *Aug. 22, 2023

(54) ADAPTIVE FOVEATED ENCODER AND GLOBAL MOTION PREDICTOR

(71) Applicant: Intel Corporation, Santa Clara, CA (US)

(72) Inventors: Yunbiao Lin, Shanghai (CN); Changliang Wang, Bellevue, WA (US); Ce Wang, Bellevue, WA (US); Yongfa Zhou, Beijing (CN); Bo Zhao, Shanghai (CN); Ping Liu, Sunnyvale, CA (US); Jianwei Yang, Beijing (CN); Zhan Lou, Shanghai (CN); Yu Yang, Beijing (CN); Yating Wang, Beijing (CN); Wenyi Tang, Beijing (CN); Bo Qiu, Hillsboro, CA (US)

(73) Assignee: Intel Corporation, Santa Clara, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/526,388

(22) Filed: Nov. 15, 2021

(65) Prior Publication Data
US 2022/0150533 A1 May 12, 2022

Related U.S. Application Data

(63) Continuation of application No. 16/651,676, filed as application No. PCT/CN2017/112645 on Nov. 23, 2017, now Pat. No. 11,178,424.

(51) Int. Cl.
*H04N 7/12* (2006.01)
*H04N 19/527* (2014.01)
(Continued)

(52) U.S. Cl.
CPC ......... *H04N 19/527* (2014.11); *H04N 19/154* (2014.11); *H04N 19/167* (2014.11);
(Continued)

(58) Field of Classification Search
CPC .......................... H04N 19/527; H04N 19/167
See application file for complete search history.

(56) References Cited

U.S. PATENT DOCUMENTS

| 9,491,490 B1 | 11/2016 | Toth et al. |
| 2015/0264299 A1 | 9/2015 | Leech et al. |

(Continued)

FOREIGN PATENT DOCUMENTS

| CN | 104407700 A | 3/2015 |
| CN | 107194163 A | 9/2017 |
| WO | 2017099824 A1 | 6/2017 |

OTHER PUBLICATIONS

International Search Report and Written Opinion for International Patent Application No. PCT/CN2017/112645, dated Aug. 17, 2018, 9 pages.

(Continued)

*Primary Examiner* — Y Lee
(74) *Attorney, Agent, or Firm* — Jordan IP Law, LLC

(57) ABSTRACT

An embodiment of an adaptive video encoder may include technology to determine headset-related information including at least one of focus-related information and motion-related information, and determine one or more video encode parameters based on the headset-related information. Other embodiments are disclosed and claimed.

24 Claims, 32 Drawing Sheets

(51) Int. Cl.
*H04N 19/154* (2014.01)
*H04N 19/167* (2014.01)
*H04N 19/176* (2014.01)
*H04N 19/52* (2014.01)
*H04N 19/189* (2014.01)
*H04N 21/6587* (2011.01)
*H04N 13/161* (2018.01)

(52) U.S. Cl.
CPC ......... *H04N 19/176* (2014.11); *H04N 19/189* (2014.11); *H04N 19/52* (2014.11); *H04N 21/6587* (2013.01); *H04N 13/161* (2018.05)

(56) References Cited

U.S. PATENT DOCUMENTS

2017/0160518 A1 6/2017 Lanman et al.
2018/0286105 A1 10/2018 Surti et al.

OTHER PUBLICATIONS

Solbach, Markus, github.com/srv/6dof_stereo_ekf_slam/blob/master/quaternion/quatToMatrix.m, posted on Sep. 25, 2014, 1 page.
Notice of Allowance for U.S. Appl. No. 16/651,676, dated Jul. 6, 2021, 13 pages.

FIG. 28A   GRAPHICS PROCESSOR COMMAND FORMAT
900
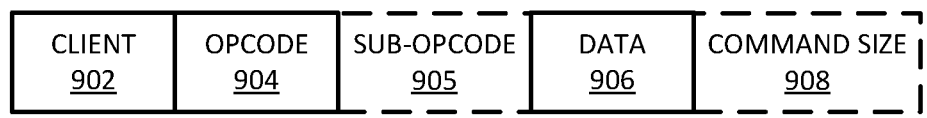
FIG. 28B   GRAPHICS PROCESSOR COMMAND SEQUENCE
910
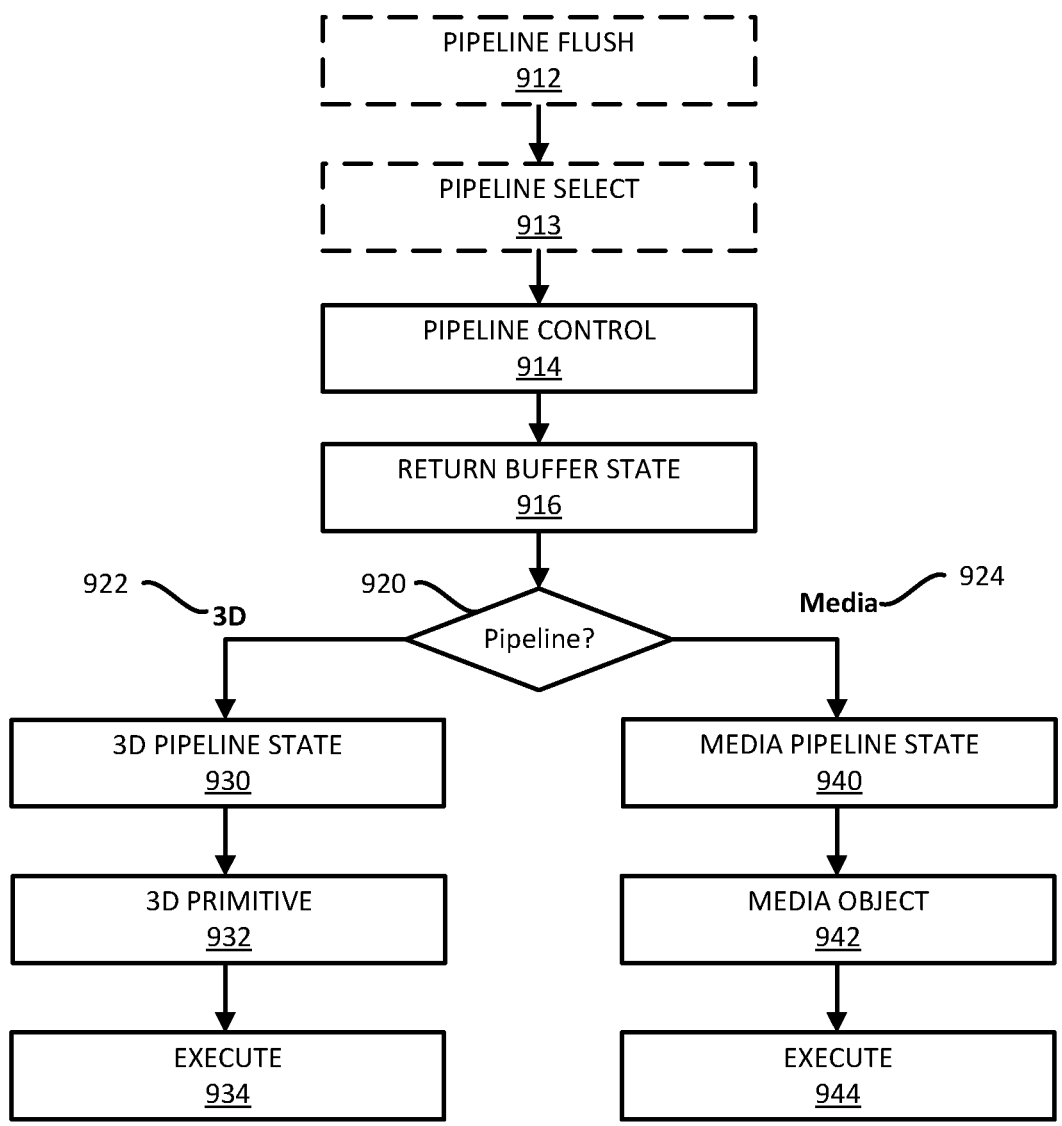

ADAPTIVE FOVEATED ENCODER AND GLOBAL MOTION PREDICTOR

CROSS-REFERENCE TO RELATED APPLICATIONS

The present application is a continuation of and claims the benefit of priority to U.S. Non-Provisional patent application Ser. No. 16/651,676 filed Mar. 27, 2020 which is a National Stage Patent Application claiming the benefit of priority to PCT Application No. PCT/CN2017/112645 filed on Nov. 23, 2017.

TECHNICAL FIELD

Embodiments generally relate to graphics systems. More particularly, embodiments relate to an adaptive foveated encoder and global motion predictor.

BACKGROUND

After an image is rendered by a graphics engine, the image may be encoded for display, transmission, and/or file storage. Fovea may refer to a small depression in the retina of the eye where visual acuity may be highest. The center of the field of vision may be focused in this region, where retinal cones may be particularly concentrated. In the context of some graphics applications, a fovea or a foveated area may correspond to an area of focus in an image or display.

BRIEF DESCRIPTION OF THE DRAWINGS

The various advantages of the embodiments will become apparent to one skilled in the art by reading the following specification and appended claims, and by referencing the following drawings, in which:

FIG. 28A is a block diagram illustrating an example of a graphics processor command format according to an embodiment;

FIG. 28B is a block diagram illustrating an example of a graphics processor command sequence according to an embodiment;

DESCRIPTION OF EMBODIMENTS

Figure 1:
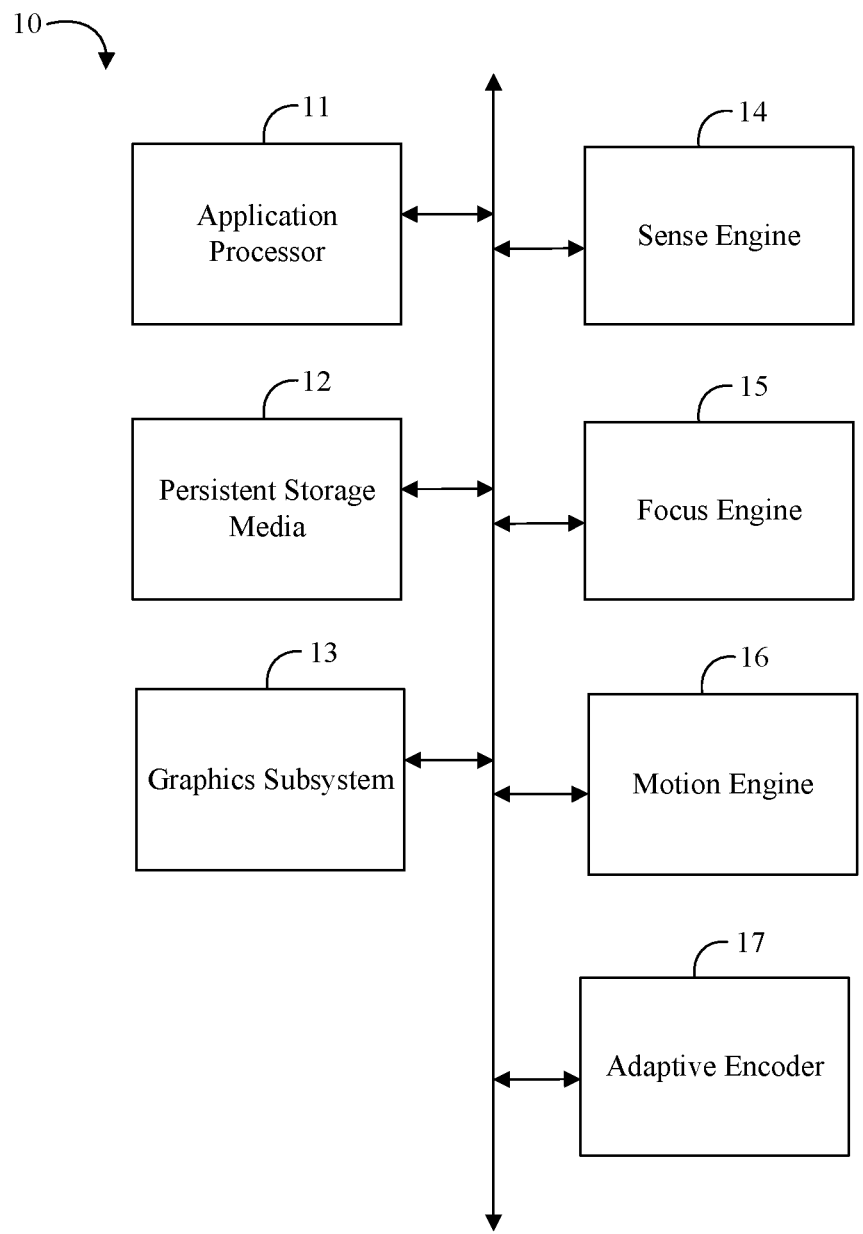
FIG. 1 is a block diagram of an example of an electronic processing system according to an embodiment.

Turning now to FIG. 1, an embodiment of an electronic processing system 10 may include an application processor 11, persistent storage media 12 communicatively coupled to the application processor 11, and a graphics subsystem 13 communicatively coupled to the application processor 11. The system 10 may further include a sense engine 14 communicatively coupled to the graphics subsystem 13 to provide sensed information, a focus engine 15 communicatively coupled to the sense engine 14 and the graphics subsystem 13 to provide focus information, a motion engine 16 communicatively coupled to the sense engine 14, the focus engine 15, and the graphics subsystem 13 to provide motion information, and an adaptive encoder 17 communicatively coupled to the motion engine 16, the focus engine 15, and the sense engine 14 to adjust one or more video encode parameters of the graphics subsystem 13 based on one or more of the sense information, the focus information, and the motion information.

In some embodiments of the system 10, the adaptive encoder 17 may further include an adaptive foveated encoder to encode an image based on the focus information (e.g., as described in more detail below). Some embodiments of the adaptive encoder 17 may further include an adaptive motion encoder to determine a global motion parameter for the encoder based on the motion information (e.g., as described in more detail below). For example, the adaptive encoder 17 may be configured to determine headset-related information including at least one of focus-related information and motion-related information, and determine one or more video encode parameters based on the headset-related information (e.g., as described in more detail below). In some embodiments, the adaptive encoder 17 may also be configured to encode a macroblock of a video image based on the one or more determined video encode parameters.

Embodiments of each of the above application processor 11, persistent storage media 12, graphics subsystem 13, sense engine 14, focus engine 15, motion engine 16, adaptive encoder 17, and other system components may be implemented in hardware, software, or any suitable combination thereof. For example, hardware implementations may include configurable logic such as, for example, programmable logic arrays (PLAs), FPGAs, complex programmable logic devices (CPLDs), or in fixed-functionality logic hardware using circuit technology such as, for example, ASIC, complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Sense Engine Examples

Figure 2:
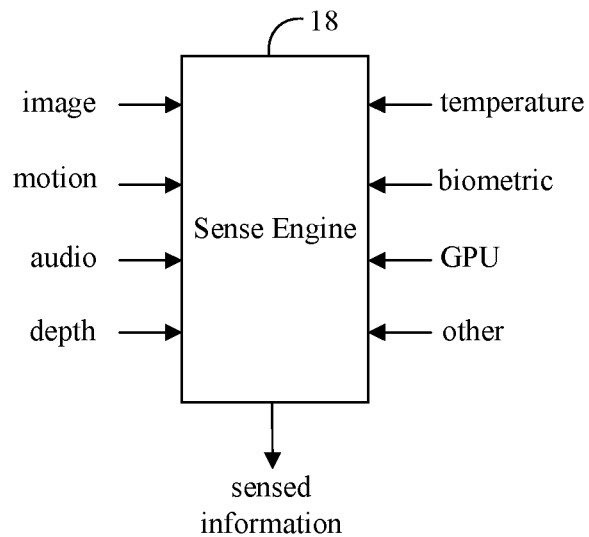
FIG. 2 is a block diagram of an example of a sense engine according to an embodiment.

Turning now to FIG. 2, a sense engine 18 may get information from sensors, content, services, and/or other sources to provide sensed information. The sensed information may include, for example, image information, audio information, motion information, depth information, temperature information, biometric information, graphics processor unit (GPU) information, etc. At a high level, some embodiments may use sensed information to adjust video encode parameters of the graphics system.

For example, a sense engine may include a sensor hub communicatively coupled to two dimensional (2D) cameras, three dimensional (3D) cameras, depth cameras, gyroscopes, accelerometers, inertial measurement units (IMUs), first and second order motion meters, location services, microphones, proximity sensors, thermometers, biometric sensors, etc., and/or a combination of multiple sources which provide information to the focus and/or motion engines. The sensor hub may be distributed across multiple devices. The information from the sensor hub may include or be combined with input data from the user's devices (e.g., touch data).

For example, the user's device(s) may include one or more 2D, 3D, and/or depth cameras. The user's device(s) may also include gyroscopes, accelerometers, IMUs, location services, thermometers, biometric sensors, etc. For example, the user may wear a head-mounted display (HMD) which includes a variety of cameras, motion sensors, and/or other sensors. A non-limiting example of a mixed reality HMD includes the MICROSOFT HOLOLENS. The user may also carry a smartphone (e.g., in the user's pocket) and/or may wear a wearable device (e.g., such as a smart watch, an activity monitor, and/or a fitness tracker). The user's device(s) may also include a microphone which may be utilized to detect if the user is speaking, on the phone, speaking to another nearby person, etc. The sensor hub may include some or all of the user's various devices which are capable of capturing information related to the user's actions or activity (e.g., including an input/output (I/O) interface of the user devices which can capture keyboard/mouse/touch activity). The sensor hub may get information directly from the capture devices of the user's devices (e.g., wired or wirelessly) or the sensor hub may be able to integrate information from the devices from a server or a service (e.g., information may be uploaded from a fitness tracker to a cloud service, which the sensor hub may download).

Focus Engine Examples

Figure 3:
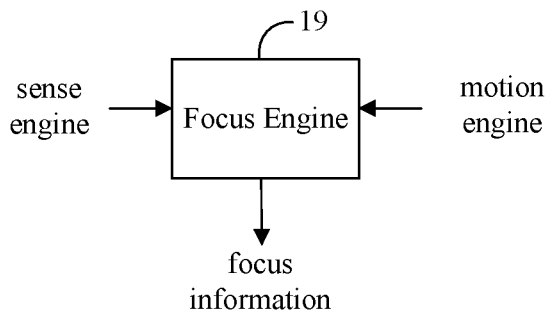
FIG. 3 is a block diagram of an example of a focus engine according to an embodiment.

Turning now to FIG. 3, a focus engine 19 may get information from the sense engine and/or motion engine and other sources to provide focus information. The focus information may include, for example, a focal point, a focus area, an eye position, eye motion, pupil size, pupil dilation, depth of focus (DOF), a content focal point, a content focus object, a content focus area, etc. The focus information may also include prior focus information, determined future focus information, and/or predicted focus information (e.g., a predicted focal point, a predicted focus area, a predicted eye position, predicted eye motion, predicted pupil size, predicted pupil dilation, predicted DOF, determined future content focal point, determined future content focus object, determined future content focus area, predicted content focal point, predicted content focus object, predicted content focus area, etc.).

At a high level, some embodiments may use focus information to adjust video encode parameters of the graphics system based on 1) where the user is assumed to be looking, 2) where the user is determined to be looking, 3) where an application wants the user to look, and/or 4) where the user is predicted to be looking in the future. Some focus cues may be stronger in the focal region of where the user is looking. If the user is looking straight ahead they may see things in sharp focus. With scenes or objects towards the periphery, the user may notice motion but not details in sharp focus.

For example, the focus information may be static and/or based on assumptions (e.g., the user may be assumed to be looking at the center of screen with fixed eye position, DOF, etc.), if there is limited sensed information or processing capability of the graphics system (e.g., an attached HMD or host cannot provide or make use of the information). The focus information may also change dynamically based on factors such as motion information (e.g., from a virtual reality (VR) headset), motion prediction information, content information (e.g., motion in the scene), etc. More preferably, a better user experience may be provided with a rich sensor set including eye tracking (e.g., sometimes also referred to as gaze tracking) to identify the focus region and provide the focus information. Some embodiments, for example, may include an eye tracker or get eye information from an eye tracker to track the user's eyes. The eye information, may include eye position, eye motion, pupil size/dilation, depth of focus, etc. An eye tracker may capture an image of the user's eye, including the pupil. The user's focal point and/or DOF may be determined, inferred, and/or estimated based on the eye position and pupil dilation. The user may go through a calibration process which may help the eye tracker provide more accurate focus and/or DOF information.

When a user is wearing a VR headset, for example, a camera may capture an image of a pupil and the system may determine where the user is looking (e.g., a focus area, depth, and/or direction). The camera may capture pupil dilation information and the system may infer where the user's focus area is based on that information. For example, a human eye has a certain DOF such that if the person is focusing on something nearby, things farther away may be blurred. The focus information may include a focal point at a focus distance X, and DOF information of delta(X), so the focus area may correspond to X+/−delta[X] positioned around at the user's focal point. The size of the DOF may vary with the distance X (e.g., a different delta at different focus distances). For example, the user's DOF may be calibrated and may vary in each direction (e.g., x, y, and z) such that the function delta[X] may not necessarily be spherical.

In some embodiments, the focus information may include content-based focus information. For example, in a 3D, VR, augmented reality (AR), and/or merged reality environment, depth and/or distance information may be provided from an application (e.g., where user is in the virtual environment, where objects are, and/or how far the objects are from the user, etc.). Content-based focus information may also include a point, object, or area in the content where the application wants the user to focus, such as something more interesting happening that the application wants the user's attention. The application may also be able to provide future content focus information because the application may know motion information for the content and/or what objects/areas in a next frame or scene may be of more interest to the user (e.g., an object about to enter the scene from an edge of the screen).

Motion Engine Examples

Figure 4:
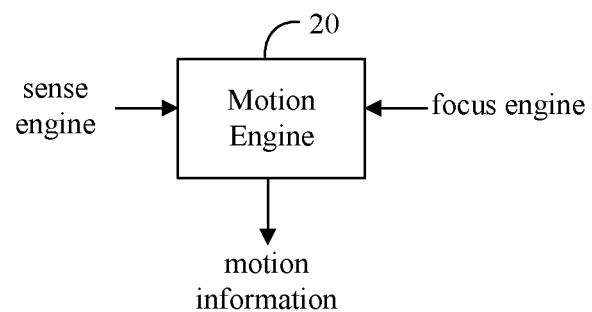
FIG. 4 is a block diagram of an example of a motion engine according to an embodiment.

Turning now to FIG. 4, a motion engine 20 may get information from the sense engine and/or focus engine and other sources to provide motion information. The motion information may include, for example, head position, head velocity, head acceleration, head motion direction, eye velocity, eye acceleration, eye motion direction, object position, object velocity, object acceleration, object motion direction, etc. The motion information may also include prior motion information, determined future motion information, and/or predicted motion information (e.g., a predicted head velocity, a predicted head acceleration, a predicted head position, a predicted head motion direction, a predicted eye velocity, a predicted eye acceleration, a predicted eye motion direction, determined future content position, determined future content object velocity, determined future content object acceleration, predicted object position, predicted object velocity, predicted object acceleration, etc.).

At a high level, some embodiments may use motion information to adjust video encode parameters of the graphics system based on 1) the user moving their head, 2) the user moving their eyes, 3) the user moving their body, 4) where an application wants the user to turn their head, eyes, and/or body, and/or 4) where the user is predicted to turn their head, eyes, and/or body in the future. Some motion information may be determined readily from the sensed information. For example, head position, velocity, acceleration, motion direction, etc. may be determined from an accelerometer. Eye motion information may be determined by tracking eye position information over time (e.g., if the eye tracker provides only eye position information).

Some motion information may be content-based. In a game or on-the-fly 3D content, for example, the application may know how quickly and where the objects are moving. The application may provide the information to the motion engine (e.g., through an API call). Future content-based object motion information for a next frame/scene may also be fed into the motion engine for decision making. Some content-based motion information may be determined by image processing or machine vision processing the content.

Some embodiments of a machine vision system, for example, may analyze and/or perform feature/object recognition on images captured by a camera. For example, machine vision and/or image processing may identify and/or recognize objects in a scene (e.g., that an edge belongs to a front of a chair). The machine vision system may also be configured to perform facial recognition, gaze tracking, facial expression recognition, and/or gesture recognition including body-level gestures, arm/leg-level gestures, hand-level gestures, and/or finger-level gestures. The machine vision system may be configured to classify an action of the user. In some embodiments, a suitably configured machine vision system may be able to determine if the user is present at a computer, typing at a keyboard, using the mouse, using the trackpad, using the touchscreen, using a HMD, using a VR system, sitting, standing, and/or otherwise taking some other action or activity.

For example, the motion engine may get camera data related to a real object in a scene and may use that information to identify motion and orientation of the real object. The motion engine may get latency information from the graphics processor. The motion engine may then predict the next frame orientation of that real object. The amount of latency may be based on one or more of time to render and/or encode a scene, number of virtual objects in the scene, and a complexity of the scene, etc. For example, a sense engine may include one or more cameras to capture a real scene. For example, the one or more cameras may include one or more 2D cameras, 3D cameras, depth cameras, high speed cameras, or other image capture devices. The real scene may include an object moving in the scene. The cameras may be coupled to an image processor to process data from the cameras to identify objects in the scene (e.g., including the moving object) and to identify motion of the object (e.g., including orientation information). The motion engine may determine predicted motion information based on tracking the motion of the object and predict a future position of the object based on a measured or estimated latency (e.g., from the time of capture to the time of rendering/encoding). In accordance with some embodiments, various motion tracking and/or motion prediction techniques may be augmented with optical flow and other real motion estimation techniques to determine the next location of the real objects. For example, some embodiments may use extended common filtering and/or perspective processing (e.g., from autonomous driving applications) to predict motion of objects.

Engine Overlap Examples

Those skilled in the art will appreciate that aspects of various engines described herein may overlap with other engines and that portions of each engine may be implemented or distributed throughout various portions of an electronic processing system. For example, the focus engine may use motion information to provide a predicted future focus area and the motion engine may use focus information to predict a future motion. Eye motion information may come directly from the sense engine, may be determined/predicted by the focus engine, and/or may be determined/predicted by the motion engine. The examples herein should be considered as illustrative and not limiting in terms of specific implementations.

Adaptive Foveated Encoder and Global Motion Predictor Examples

Figure 5:
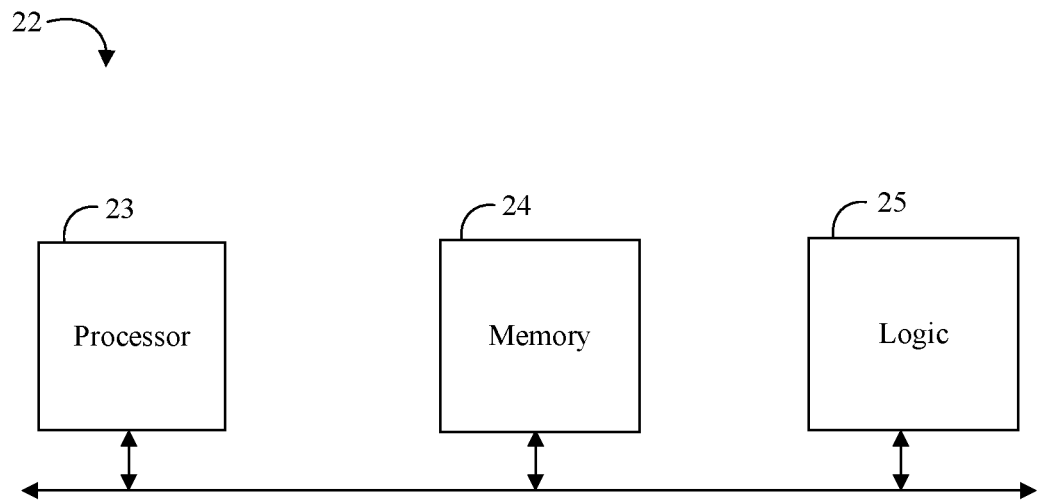
FIG. 5 is a block diagram of another example of an electronic processing system according to an embodiment.

Turning now to FIG. 5, an embodiment of an electronic processing system 22 may include a processor 23, memory 24 communicatively coupled to the processor 23, and logic 25 communicatively coupled to the processor 23 to determine headset-related information including at least one of focus-related information and motion-related information, and determine one or more video encode parameters based on the headset-related information. In some embodiments, the logic 25 may be further configured to adjust a quality parameter for an encode of a macroblock based on the focus-related information. For example, the logic 25 may be configured to identify a focus region based on the focus-related information, and adjust the quality parameter for the encode to provide relatively higher quality for macroblocks inside the focus region as compared to macroblocks outside of the focus region. Additionally, or alternatively, in some embodiments the logic 25 may be further configured to determine a global motion predictor for an encode of a macroblock based on the motion-related information. For example, the logic 25 may additionally or alternatively configured to determine a hierarchical motion estimation offset based on a current head position from the motion-related information, a previous head position, and a center point. For any of the embodiments, the logic 25 may be further configured to encode a macroblock of a video image based on the one or more determined video encode parameters. In some embodiments, any of the processor 23, memory 24, and logic 25 may be completely or partially co-located on a same integrated circuit die.

Embodiments of each of the above processor 23, memory 24, logic 25, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 24, persistent storage media, or other system memory may store a set of instructions which when executed by the processor 23 cause the system 22 to implement one or more components, features, or aspects of the system 22 (e.g., the logic 25, determining headset-related information including at least one of focus-related information and motion-related information, determining one or more video encode parameters based on the headset-related information, etc.).

Figure 6:
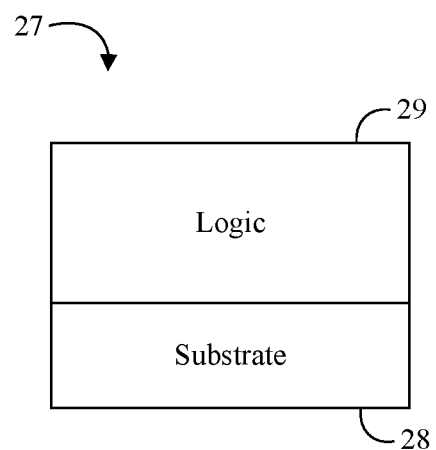
FIG. 6 is a block diagram of an example of a semiconductor package apparatus according to an embodiment.

Turning now to FIG. 6, an embodiment of a semiconductor package apparatus 27 may include one or more substrates 28, and logic 29 coupled to the one or more substrates 28, wherein the logic is at least partly implemented in one or more of configurable logic and fixed-functionality hardware logic, the logic 29 coupled to the one or more substrates 28 to determine headset-related information including at least one of focus-related information and motion-related information, and determine one or more video encode parameters based on the headset-related information. In some embodiments, the logic 29 may be further configured to adjust a quality parameter for an encode of a macroblock based on the focus-related information. For example, the logic 29 may be configured to identify a focus region based on the focus-related information, and adjust the quality parameter for the encode to provide relatively higher quality for macroblocks inside the focus region as compared to macroblocks outside of the focus region. Additionally, or alternatively, in some embodiments the logic 29 may be further configured to determine a global motion predictor for an encode of a macroblock based on the motion-related information. For example, the logic 29 may additionally or alternatively configured to determine a hierarchical motion estimation offset based on a current head position from the motion-related information, a previous head position, and a center point. For any of the embodiments, the logic 29 may be further configured to encode a macroblock of a video image based on the one or more determined video encode parameters.

Embodiments of logic 29, and other components of the apparatus 27, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS to applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 7A:
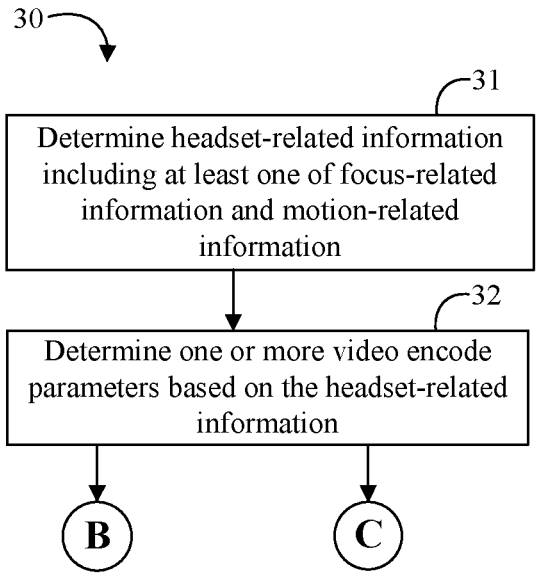
FIGS. 7A to 7C are flowcharts of another example of a method of adaptive encoding according to an embodiment.
Figure 7B:
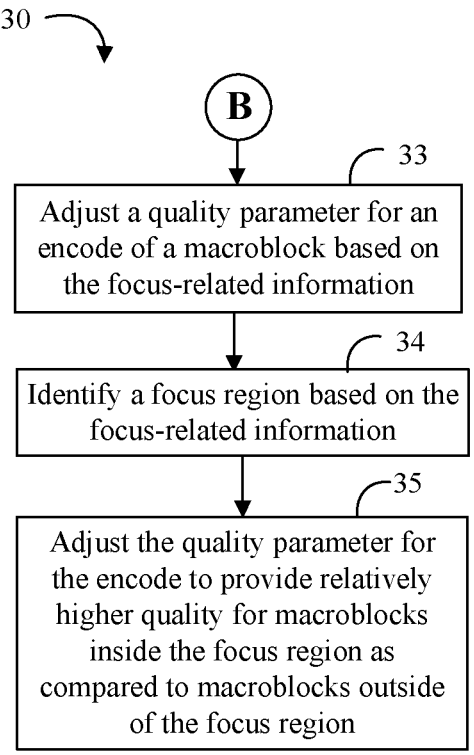
Figure 7C:
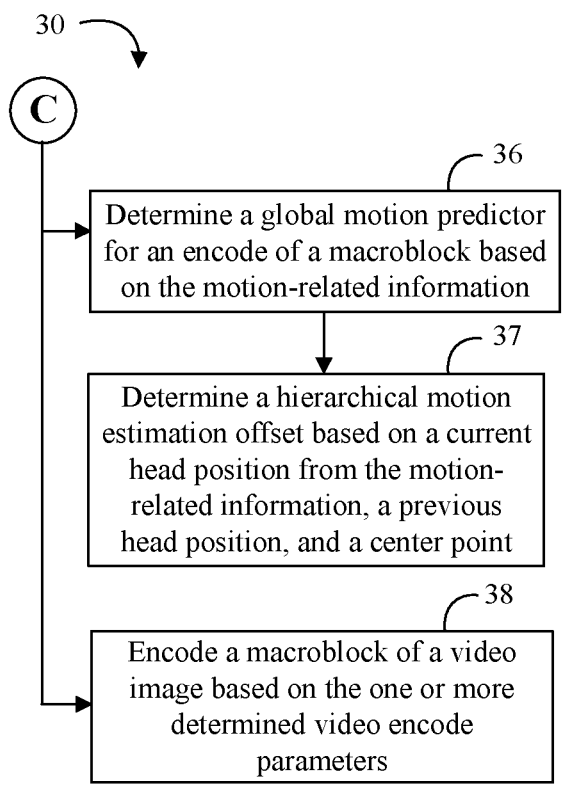

Turning now to FIGS. 7A to 7C, an embodiment of a method 30 of adaptive encoding may include determining headset-related information including at least one of focus-related information and motion-related information at block 31, and determining one or more video encode parameters based on the headset-related information at block 32. In some embodiments, the method 30 may additionally or alternatively include adjusting a quality parameter for an encode of a macroblock based on the focus-related information at block 33. For example, the method 30 may include identifying a focus region based on the focus-related information at block 34, and adjusting the quality parameter for the encode to provide relatively higher quality for macroblocks inside the focus region as compared to macroblocks outside of the focus region at block 35. Additionally, or alternatively, some embodiments of the method 30 may include determining a global motion predictor for an encode of a macroblock based on the motion-related information at block 36. For example, the method 30 may include determining a hierarchical motion estimation offset based on a current head position from the motion-related information, a previous head position, and a center point at block 37. For any of the embodiments, the method 30 may further include encoding a macroblock of a video image based on the one or more determined video encode parameters at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, to SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 8:
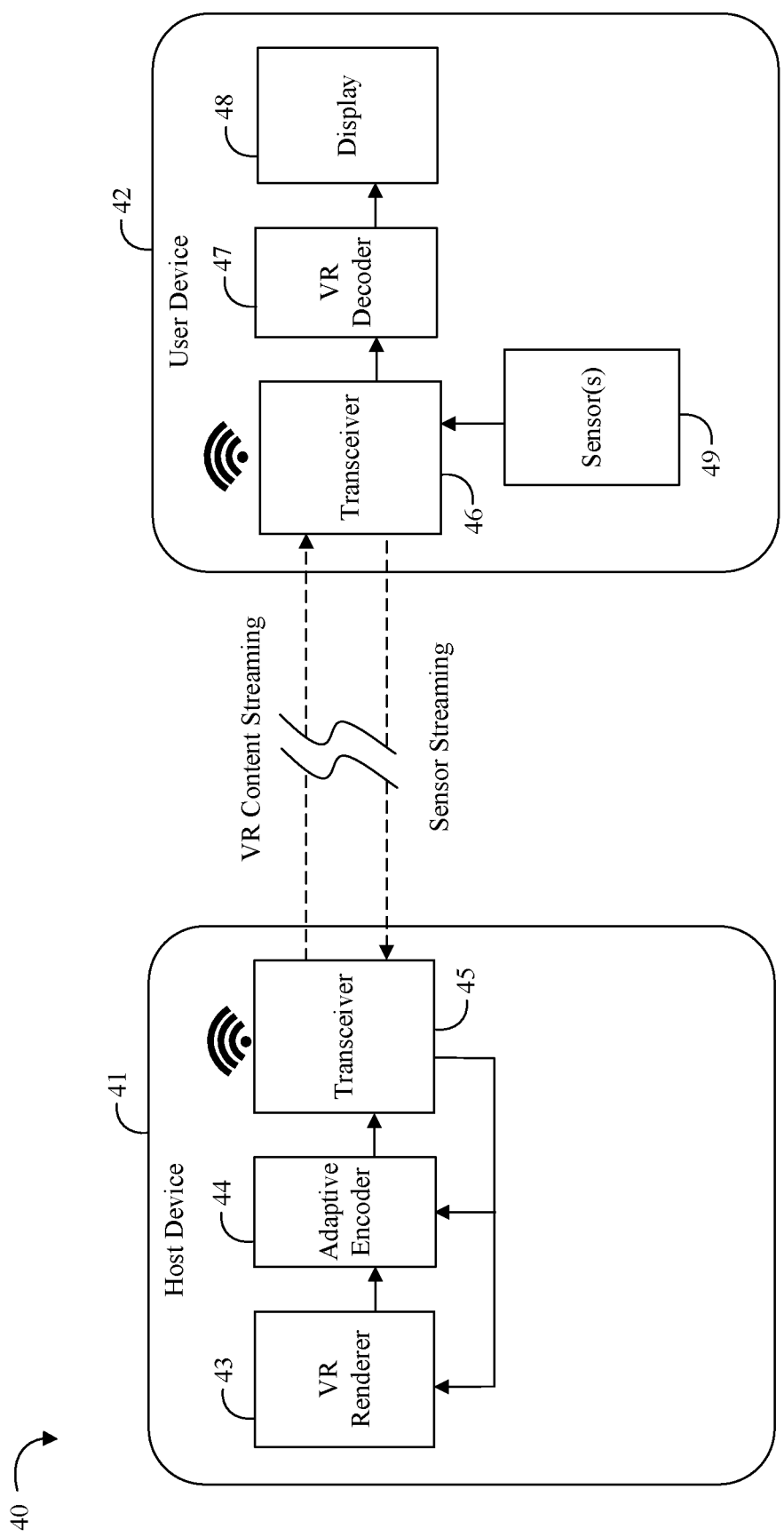
FIG. 8 is a block diagram of another example of an electronic processing system according to an embodiment.

Turning now to FIG. 8, an embodiment of an electronic processing system 40 may include a host device 41 (e.g., a personal computer, a server, etc.) communicatively coupled to a user device 42 (e.g., a smartphone, a tablet, a HMD, etc.), wired or wirelessly. The host device 41 may include a VR renderer 43 (e.g., a high performance graphics adapter) communicatively coupled to an adaptive encoder 44, which in turn may be communicatively coupled to a transceiver 45 (e.g., WIFI, WIGIG, ETHERNET, etc.). For example, the adaptive encoder 44 may utilize advanced video coding (AVC) and/or high-efficiency video coding (HEVC) and may be performed by a graphics processor or external graphics adapter. The user device 42 may include a transceiver 46 (e.g., configured to exchange information with the transceiver 45 of the host device 41) communicatively coupled to a VR decoder 47, which in turn is communicatively coupled to a display 48. The user device 42 may further include one or more sensors 49.

The host device 41 may include one or more GPUs which implement all or portions of the VR renderer 43 and the adaptive encoder 44. The host device 41 may render VR graphics/video image content, encode that content and stream the VR content to the user device 42. The user device 42 may decode the VR content and present the graphics/video image on the display 48. The user device may also support other local functions such as asynchronous time warp (ATW), frame buffer rendering (FBR), barrel distortion correction, etc. In accordance with some embodiments, the user device 42 may provide sensor-related information back to the host device 41 for advantageous utilization by the adaptive encoder 44 as described herein. For example, the user device 42 may transmit the HMD position, 3 degrees of freedom (3 DOF) information, 6 degrees of freedom (6 DOF) information, and/or other sensor data back to the host device 41. For example, the adaptive encoder 44 may advantageously include one or both of an adaptive motion encoder and/or an adaptive foveated encoder to adjust one or more video encode parameters based on the sensor-related information received from the user device 42.

Adaptive Motion Encoder Example

Figure 9:
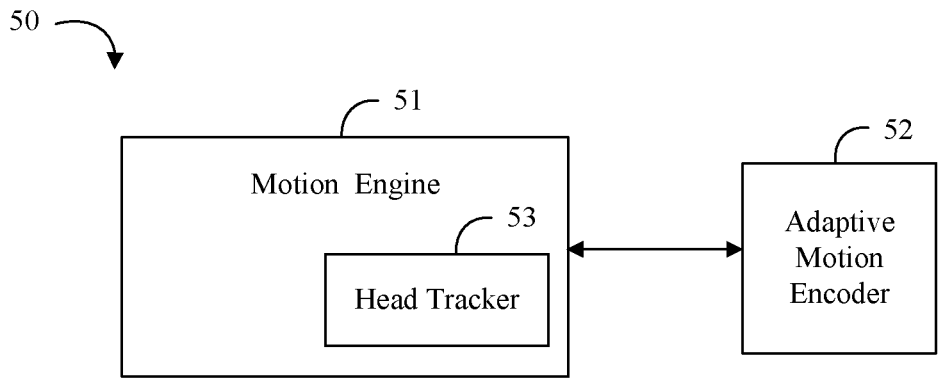
FIG. 9 is a block diagram of an example of an adaptive encoder according to an embodiment.

Turning now to FIG. 9, an embodiment of an adaptive motion encoder apparatus 50 may include a motion engine 51 to provide motion information, and an adaptive motion encoder 52 communicatively coupled to the motion engine 51 to adjust one or more video encode parameters based on the motion information. In some embodiments, the motion engine 51 may include a head tracker 53 to identify a head position/motion (e.g., or get head position/motion information from an attached HMD). For example, the motion engine 51 may get motion-related information, including a head position, from a headset (e.g., such as a VR HMD worn by a user). For example, the adaptive motion encoder 52 may be configured to determine a global motion parameter based on the motion information. For example, the one or more video encode parameters may include motion vectors based on a global motion predictor, and the adaptive motion encoder 52 may determine the global motion predictor based on head position information from the motion engine 51. In some embodiments, the adaptive motion encoder 52 may adjust the motion vectors for encoding macroblocks based on the motion-related information. The adaptive motion encoder 52 may also be configured to encode the macroblocks of the video image based on the one or more determined video encode parameters (e.g., including the global motion predictor values determined from the head position/motion information).

Embodiments of each of the above motion engine 51, adaptive motion encoder 52, head tracker 53, and other components of the apparatus 50 may be implemented in hardware, software, or any combination thereof. For example, portions or all of the apparatus 50 may be implemented as part of a parallel GPU, further configured with an adaptive motion encoder as described herein. The apparatus 50 may also be adapted to work with a stereo HMD system. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 10:
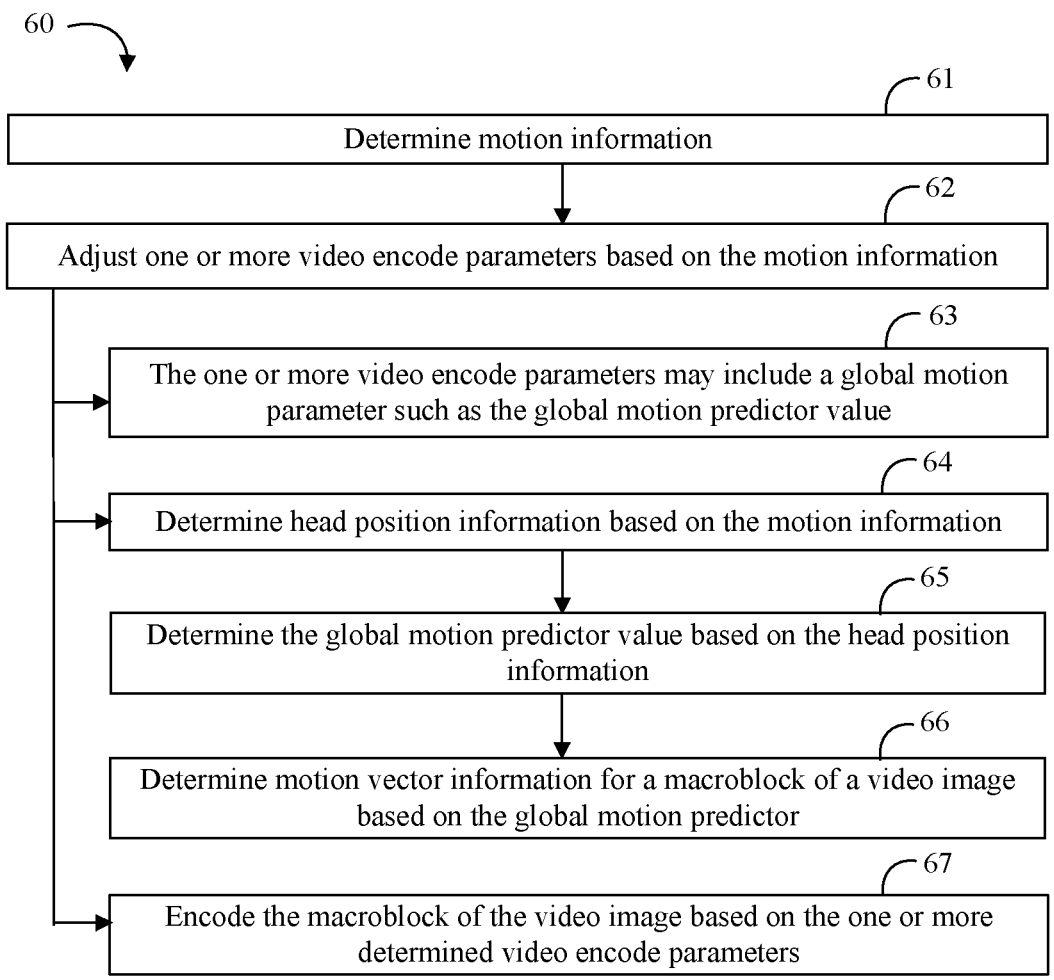
FIG. 10 is flowchart of an example of a method of adaptive encoding according to an embodiment.

Turning now to FIG. 10, an embodiment of a method 60 of adaptive encoding may include determining motion information at block 61, and adjusting one or more video encode parameters based on the motion information at block 62. For example, the one or more video encode parameters may include a global motion parameter such as the global motion predictor value at block 63. The method 60 may further include determining head position information based on the motion information at block 64, and determining the global motion predictor value based on the head position information at block 65. In some embodiments, the method may also include determining motion vector information for a macroblock of a video image based on the global motion predictor at block 66, and encoding the macroblock of the video image based on the one or more determined video encode parameters at block 67.

Embodiments of the method 60 may be implemented in a system, apparatus, GPU, PPU, or a media processor. More particularly, hardware implementations of the method 60 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 60 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

For example, embodiments or portions of the method 60 may be implemented in firmware, applications (e.g., through an API), or driver software. Other embodiments or portions of the method 60 may be implemented in specialized code (e.g., shaders) to be executed on a GPU. Other embodiments or portions of the method 60 may be implemented in fixed function logic or specialized hardware (e.g., in the GPU or the media processor).

Some embodiments may advantageously leverage the HMD position as a global motion predictor to improve encoding efficiency for VR streaming. Non-limiting examples of application for some embodiments may include AR, VR, computer generated holography, VR gaming, auto infotainment, and automated driver assistance systems. In some embodiments, a wireless VR streaming system (e.g., such as the system 40 in FIG. 8) may improve the user experience as compared to an all-in-one system. In particular, the higher computational workload may be handled by the host device while a battery-powered user device may only need to receive, decode, and display the image data (thereby reducing the weight and extending the battery life of the user device). Providing a wireless connection advantageously untethers the user from the host device and provides greater freedom of movement for the user.

For wireless VR streaming, the video encoding may play an important role to generate high quality content within target bitrates. For example, a user may like to play a VR game wearing a HMD, and the scene may be changed according to the user's head movement. In order to handle large motions, hierarchical motion estimation (HME) may be used to predict motions. Some other systems may utilize a 32 times motion estimation (32×ME), also referred to as ultra HME (UHME), together with a 16 time motion estimation (16×ME), also referred to as super HME (SHME), to downscale the original surface and reference frames, and estimate the global motion vectors. A video encoding pipeline may provide the output of the 32×ME computation to the 16×ME computation, which in turn may be provided to a 4 times motion estimation (4×ME) computation to predict the motion vectors for encoding. Both the 32×ME and the 16×ME computations may be highly GPU computing intensive. Some embodiments may estimate the global motion vectors based on head position information from the HMD to advantageously replace the 32×ME and 16×ME computations with a much simpler and faster computation. Advantageously, some embodiments may get the global motion ahead of the encoding through a HMD position change and may leverage the HMD position information to compute the global motion predictor to improve the encoding quality while also reducing the computational load.

In VR usage, the scene of a game may not change very quickly, but the user's head position may change quickly (e.g., the user may turn his head around quickly in a VR game). The VR software developer kit (SDK) may get the matched head position as well as the rendered VR content. For example, 3 DOF and/or 6 DOF information may to be available to the VR SDK. Accordingly, some embodiments may use the head position to compute the global motion predictor and guide the encoder to generate the best matched motion vectors for all macroblocks of a video image to be encoded.

Figure 11:
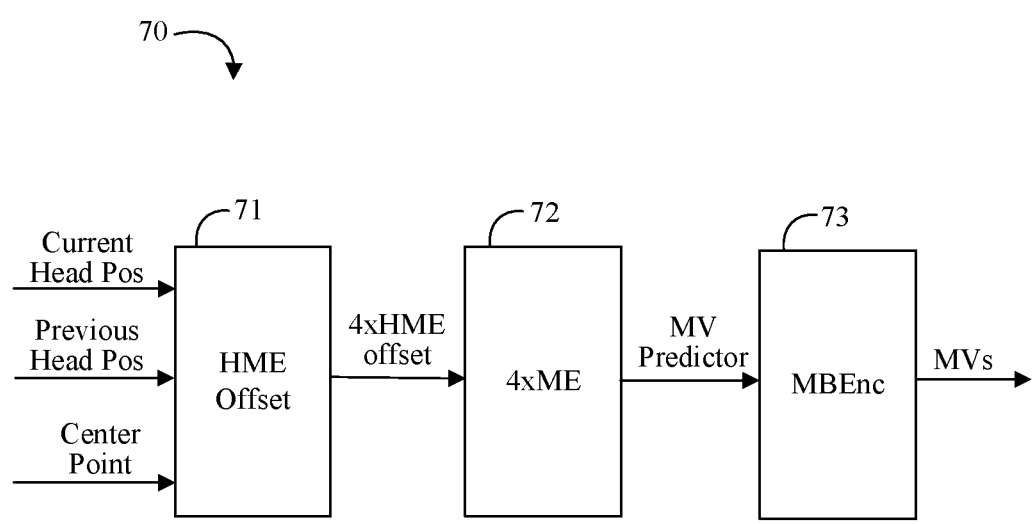
FIG. 11 is a block diagram of an example of a head motion assisted motion vector calculator according to an embodiment.

Turning now to FIG. 11, a head motion assisted motion vector calculator 70 may include a HMD offset module 71 communicatively coupled to a 4×ME module 72, which in turn may be communicatively coupled to a macroblock encode (MBEnc) module 73. The HMD offset module 71 may be provided current head position information, previous head position information, and center point information and may compute a 4×ME offset based on the provided information. For example, the HME offset module 71 may calculate the 4×HME offset based on current and previous HMD position as well as a center point 2D position (0, 0, w/2, h/2). The 4×HME offset may correspond to the offset to search around that predictor instead of a co-located (0, 0) predictor. In some embodiments, the HME offset computing may advantageously be done by a central processor unit (CPU) on the host device without processing on the original and reference surfaces.

Figure 12:
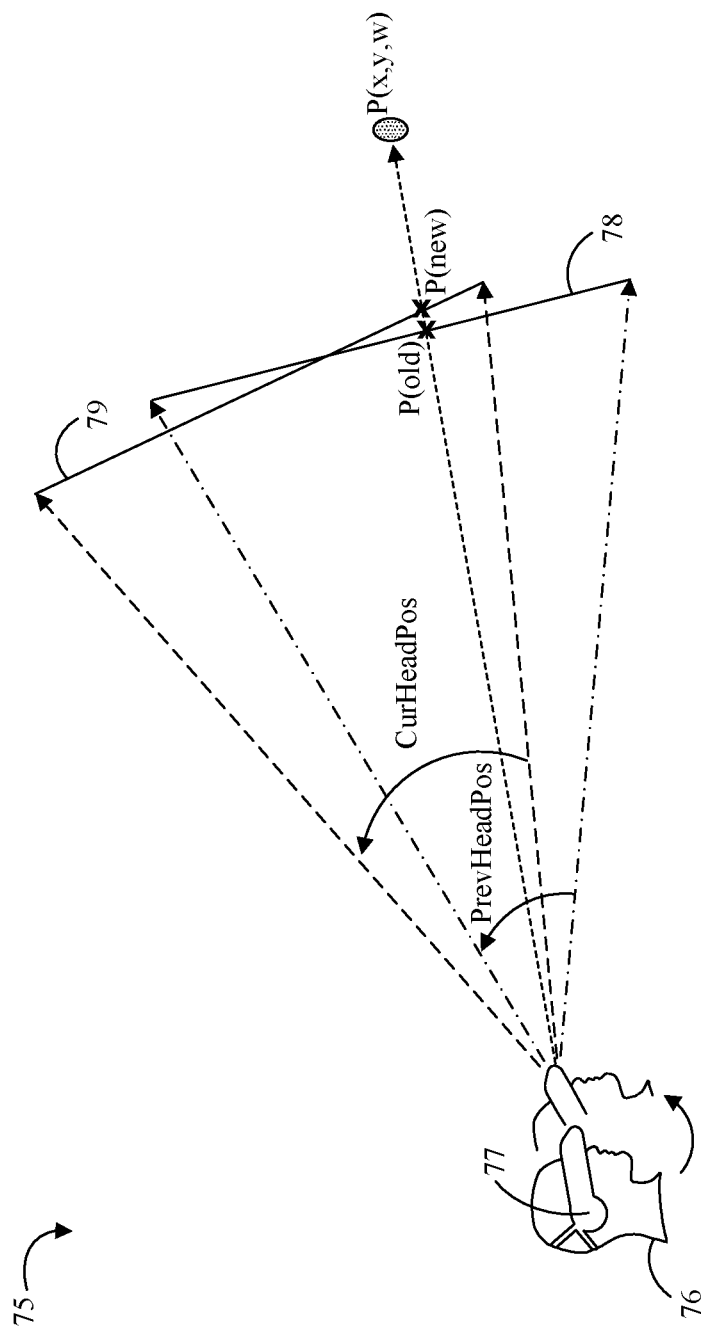
FIG. 12 is an illustrative diagram of an example of a VR projection model according to an embodiment.

Turning now to FIG. 12, an illustrative diagram of a VR projection model 75 may include a user 76 wearing a VR HMD 77. The user 76 may change their head position from a previous head position (PrevHeadPos) to a current head position (CurHeadPos), such that a point in the VR scene moves in screen space from the point P(old) to the point P(new). Projective geometry may have an extra dimension, called W, in addition to the X, Y, and Z dimensions. This four-dimensional space may be called projective space, and coordinates in projective space may be called homogeneous coordinates. A homogenous coordinate P(x, y, z, w) may correspond to the points P(old) and P(new) in the projective space. The following equations explain one example of how to calculate the HME offset based on the HMD position by projecting a point in the 3D scene into a 2D surface.

MatrixHeadPos4×4=quatToMatrix(Head.w,Head.x, Head.y,Head.z) [Eq. 1]

The function quatToMatrix(qw, qx, qy, qz) may convert a quaternion to a rotation matrix as follows:

$A$=[1.0−2.0*$qy$*$qy$−2.0*$qz$*$qz$,2.0*$qx$*$qy$−2.0*$qz$*$qw$,
... 2.0*$qx$*$qz$+2.0*$qy$*$qw$,0.0; 2.0*$qx$*$qy$+
2.0*$qz$*$qw$,1.0−2.0*$qx$*$qx$−2.0*$qz$*$qz$, ...
2.0*$qy$*$qz$−2.0*$qx$*$qw$,0.0; 2.0*$qx$*$qz$−
2.0*$qy$*$qw$,2.0*$qy$*$qz$+2.0*$qx$*$qw$, ... 1.0−
2.0*$qx$*$qx$−2.0*$qy$*$qy$,0.0; 0.0,0.0,0.0,1.0];

end

Point 2D($x,y$)=Point 3D($x,y,z,w$)*MatrixHeadPos4×4 [Eq. 2]

where Head (w, x, y, z) is the current HMD position, Point3D(x, y, z, w) is the pixel in the 3D world coordinate, and Point2D(x, y) is the pixel in the final 2D image.

As shown in FIG. 12, the triangle 78 corresponds to the previous head position, and the triangle 79 corresponds to the latest head position. The two corresponding 2D points P(new) and P(old) may be determined based on Eq. 1 and Eq. 2 as follows:

Point 2Dnew($x,y$)=Point 3D($x,y,z,w$)*MatrixHeadPosNew4×4 [Eq. 3]

Point 2Dold($x,y$)=Point3D($x,y,z,w$)*MatrixHeadPosOld4×4 [Eq. 4]

Another equation may be based Eq. 3 and Eq. 4:

Point 2Dnew($x,y$)=Point2Dold($x,y$)*Invert(MatrixHeadPosOld4×4)*MatrixHeadPosNew4×4 [Eq. 5]

where Invert(MatrixHeadPosOld4×4) is to calculate the invert matrix of MatrixHeadPosOld4×4. In order to determine the global motion predictor based on the HMD position, the 4×HME offset may be calculated as follows:

MotionSearch_OFFSET(Delta$X$,Delta$Y$)=Point2Dold($x,y$)−Point2Dnew($x,y$) [Eq. 6]

Some embodiments may calculate the HME_OFFSET as follows:

MotionSearch_OFFSET(Delta$X$,Delta$Y$)=Point2Dold($x,y$)−Point2Dold($x,y$)*Invert(MatrixHeadPosOld4×4)*MatrixHeadPosNew4×4 [Eq. 7]

In order to simplify the computation, some embodiments may choose the central point of the previous 2D VR content for Point2Dold which is (width/2, height/2). Based on Eq. 7 (e.g., with the HMD position provided by the HMD), some embodiments may advantageously utilize the HMD position to predict the global motion predictor, and as a guide for the encoder's motion search.

For a wireless VR streaming system, some embodiments may improve the encoding quality with smaller latency. For example, by replacing the 32×HME and 16×HME computations in an AVC encoder, some embodiments may save a couple of milliseconds because the number of searching points may be significantly smaller. Some embodiments may also provide an encoding quality improvement as may be measured by a higher peak signal to noise ratio (PSNR) for various VR applications utilizing adaptive motion encoding as described herein as compared to encoding utilizing the 32×ME and 16×ME computations.

Adaptive Foveated Encoder Example

Figure 13:
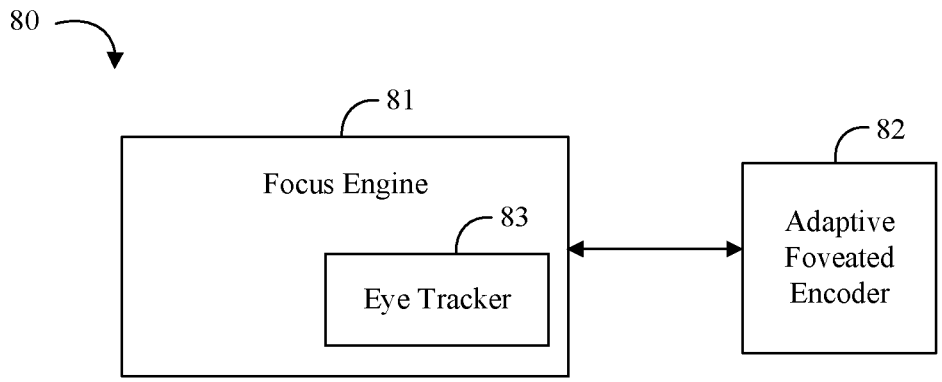
FIG. 13 is a block diagram of another example of an adaptive encoder according to an embodiment.

Turning now to FIG. 13, an embodiment of an adaptive foveated encoder apparatus 80 may include a focus engine 81 to provide focus information, and an adaptive foveated encoder 82 communicatively coupled to the focus engine 81 to adjust one or more video encode parameters based on the focus information. In some embodiments, the focus engine 81 may include an eye tracker 83 to identify a focus area (e.g., or get eye position/motion information from the HMD). For example, the focus engine 81 may get focus-related information, including a focus area, from a headset (e.g., such as a VR HMD worn by a user). For example, the adaptive foveated encoder 82 may be configured to provide a higher encode quality for a first encode region inside the focus area as compared to an encode quality for a second encode region outside the focus area. For example, the one or more video encode parameters may include an encode quality parameter such as a quantization parameter (QP) and the adaptive foveated encoder 82 may utilize a lower QP value for the first encode region as compared to a QP value for the second encode region. In some embodiments, the adaptive foveated encoder 82 may adjust the QP value for encoding a macroblock based on the focus-related information. For example, after identifying a focus region based on the focus-related information the adaptive foveated encoder 82 may adjust the QP values for the encoding to provide relatively higher quality for macroblocks inside the focus region as compared to macroblocks outside of the focus region. The adaptive foveated encoder 82 may also be configured to encode the macroblocks of the video image based on the one or more determined video encode parameters (e.g., including the focus-based QP values).

Embodiments of each of the above focus engine 81, adaptive foveated encoder 82, eye tracker 83, and other components of the apparatus 80 may be implemented in hardware, software, or any combination thereof. For example, portions or all of the apparatus 80 may be implemented as part of a parallel graphics processing unit (GPU), further configured with an adaptive foveated encoder as described herein. The apparatus 80 may also be adapted to work with a stereo HMD system. For example, hardware implementations may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 14:
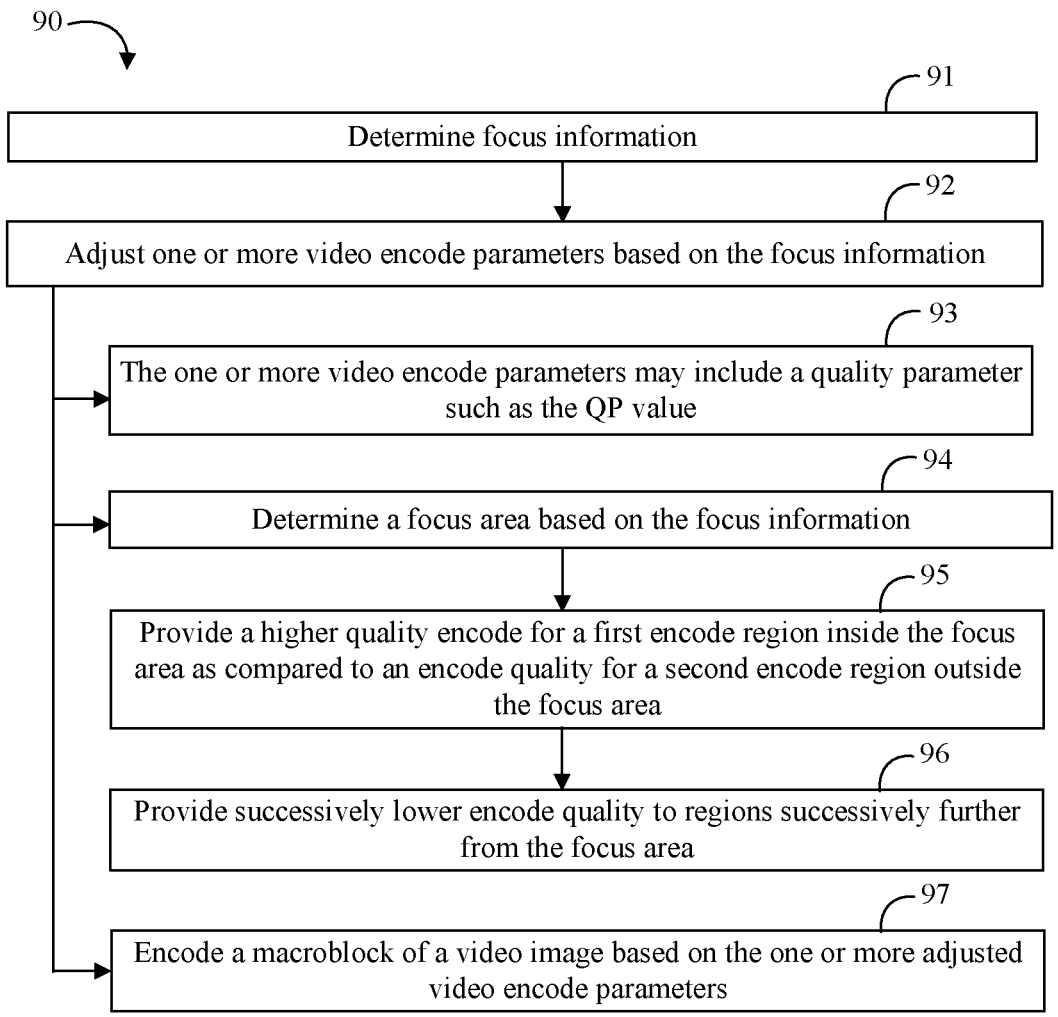
FIG. 14 is flowchart of another example of a method of adaptive encoding according to an embodiment.

Turning now to FIG. 14, an embodiment of a method 90 of adaptive encoding may include determining focus information at block 91, and adjusting one or more video encode parameters based on the focus information at block 92. For example, the one or more video encode parameters may include a quality parameter such as the QP value at block 93. The method 90 may further include determining a focus area based on the focus information at block 94, and providing a higher quality encode for a first encode region inside the focus area as compared to an encode quality for a second encode region outside the focus area at block 95. In some embodiments, the method may also include providing successively lower encode quality to regions successively further from the focus area at block 96. The method 90 may further include encoding a macroblock of a video image based on the one or more adjusted video encode parameters at block 97.

Embodiments of the method 90 may be implemented in a system, apparatus, GPU, PPU, or a media processor. More particularly, hardware implementations of the method 60 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 90 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

For example, embodiments or portions of the method 90 may be implemented in firmware, applications (e.g., through an API), or driver software. Other embodiments or portions of the method 90 may be implemented in specialized code (e.g., shaders) to be executed on a GPU. Other embodiments or portions of the method 90 may be implemented in fixed function logic or specialized hardware (e.g., in the GPU or the media processor).

In some embodiments, the focus area may be provided from a focus engine including an eye tracker which provides eye position information. Some embodiments may then use that eye position information to increase quality where the user is looking, and to degrade quality away from the focal region. In accordance with some embodiments, reducing the bitrate, increasing the QP, and/or adjusting other encode parameters may advantageously save memory, network, and/or compute bandwidth and may provide power savings.

Some embodiments may be implemented for both wired and wireless applications (e.g., wireless VR). Wireless applications may particularly benefit from selectively reducing quality away from the focus area. For example, the QP values may be increased away from the center (or area of focus). Using lower bitrate/quality may improve data transmission speed. By using higher bitrate/quality primarily in the focus region, some embodiments may efficiently dedicate resources on a region of the screen that matters most to the user.

In one example of adjusting encode quality, a region may be applied which is based on a proximity to the focus area and a desired quality/QP/bitrate/etc. corresponding to that region. For example, the regions may be designed based on study of human visual preferences. For example, there may be a number of different regions and each of the regions may be different for different quality factors. Any additional screen area outside of an outermost region may be handled at the same settings as the outer most region, or may be further degraded.

Turning now to FIGS. 15A to 15F, embodiments of sets of regions for foveated encoding may be represented by any of a variety of two or more successively surrounded, non-intersected regions. While the regions are illustrated together, each region may be defined and applied separately. The regions may have any suitable shape such as circular (e.g., FIGS. 15A and 15C), elliptical (e.g., FIGS. 15B, 15C, and 15D), square or rectangular (e.g., FIG. 15E), or arbitrary (e.g., FIG. 15F). The inner most region is generally full encode quality (e.g., 0% degraded quality/QP/etc.), but may have degradation applied in some use cases (e.g., a bandwidth saving setting, see FIG. 15F with 10% degradation). The inner most region may be surrounded by one or more successive, non-intersecting regions with successively more degradation applied for each successive region (e.g., further away from the focus area). The regions may have a common center (e.g., FIGS. 15A and 15B) or no common center (e.g., FIGS. 15D and 15F). The orientation of the regions may be aligned with the display (e.g., FIGS. 15A, 15B, 15C, and 15E) or not (e.g., FIGS. 15D and 15F). The shape of each region may be the same (e.g., FIGS. 15A, 15B, and 15D) or may be different from each other (e.g., FIGS. 15C, 15E, and 15F).

Figure 15A:
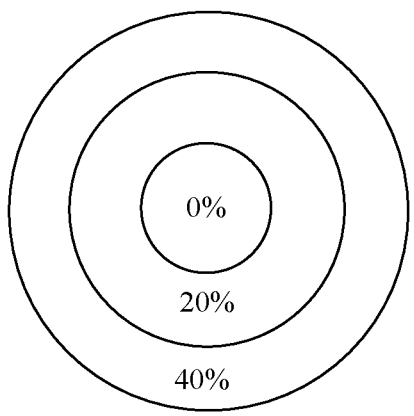
FIGS. 15A to 15F are illustrative diagrams of examples of sets of regions according to an embodiment.
Figure 15B:
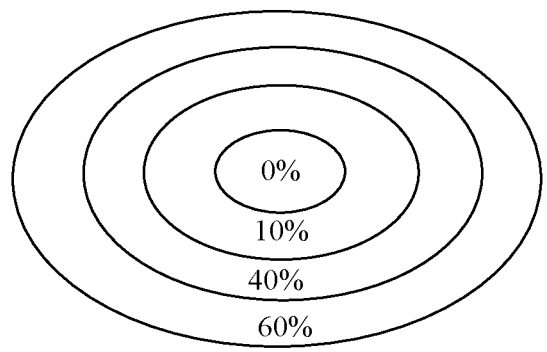
Figure 15C:
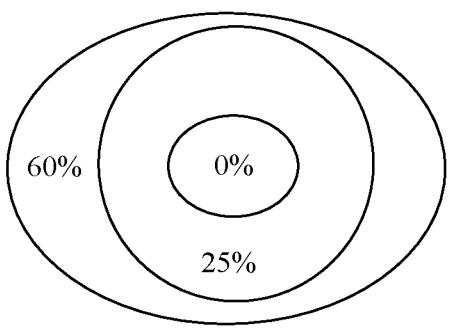
Figure 15D:
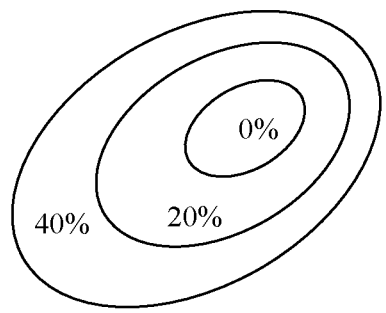
Figure 15E:
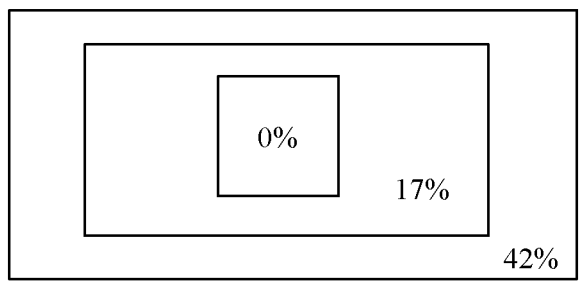
Figure 15F:
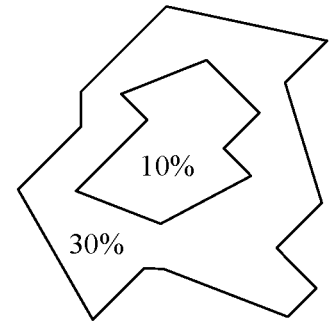
Figure 15G:
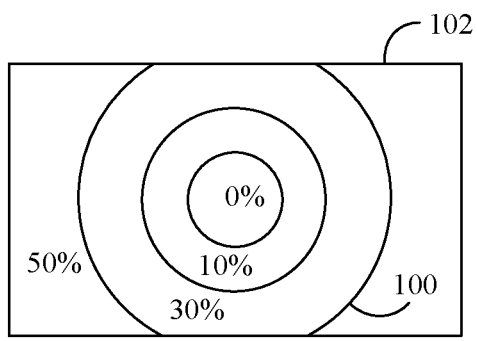
FIGS. 15G to 15H are illustrative diagrams of examples of foveated encoding according to an embodiment.
Figure 15H:
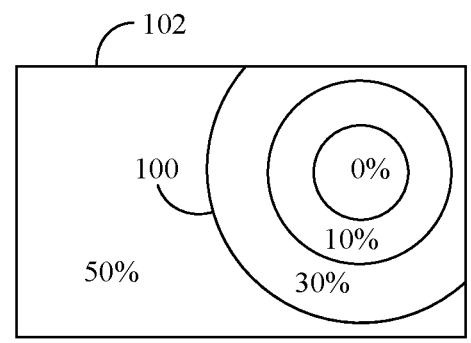

Turning now to FIGS. 15G and 15H, an embodiment of a set of regions 100 may be applied to an image area 102 based on a focus area. For example, if the focus area is roughly centered (e.g., if that is where the user is looking), the regions 100 may also be roughly centered when applied to the image area (e.g., see FIG. 15G). If the focus area moves (e.g., based on gaze information, motion information, content, etc.), the regions 100 may likewise move based on the new focus area (e.g., see FIG. 15H). For example, the innermost region may be encoded with low QP values (e.g., 0% degraded) while the outermost region may be encoded with higher QP values (e.g., 50% degraded). Additional successive regions may be provided in between the innermost and outermost regions with successively higher QP values (e.g., 10% degraded, 30% degraded, etc.).

In another example of adjusting encode quality, a formula may be applied based on the location of the target macroblock relative to the focus region. For example, the system may calculate the shortest distance from the target macroblock to the focus region boundary and reduce the quality proportionally to the calculated distance. Alternatively, a particular macroblock may be selected as the focal point (e.g., a focal macroblock) and the distance may be calculated from the target macroblock to the focal macroblock. The system may use a linear formula, a non-linear formula (e.g., parabolic, logarithmic, etc.), or other suitable formula for the proportional encode quality reduction. The system may also maintain a set of ranges for the quality reduction (e.g., neighboring blocks [no reduction]; 2 to 4 blocks away [20% reduction]; 5 or more blocks away [50% reduction]).

In some embodiments, an initial QP value may be selected, or the user may select from a set of pre-determined regions to decide how much degradation to perform for each region. For example, some people may be more sensitive to some quality parameters, but not so much to others. In some embodiments, there may be a calibration per user. Generally, eye trackers involve some user calibration. Region calibration for various quality parameters may be done at the same time as eye tracker calibration. The calibration may be based on, for example, a just noticeable difference (JND). During a calibration phase, the user may be asked to focus on an area and give a response when they notice a quality or detail change in the periphery. Or the user may be asked if two images appear the same on the periphery, when in fact there is some difference between the encoded QP values of the images (e.g., to determine how much variation is perceived by the user). In some embodiments, the calibration or other settings may be user adjustable (e.g., setting/slider bar for more compression/less compression) or included as part of various power/performance settings.

The human eye may be sensitive to motion on the periphery. The user may not recognize an object immediately but they may notice the motion. Then the motion may direct the user's gaze towards the motion. Preferably there is no sharp drop-off from one region to the next. In the focus region, for example, the encode quality may be high/full quality. In the next region if the resolution is 50% degraded, the change may be too noticeable. Gradual degradation may be preferred so the boundaries are less discrete (e.g., 0% to 25% to 50%, etc.). For example, some displays may be higher pixel density (e.g., a 4K display) and flicker may lead to motion sickness or an otherwise unfavorable user experience. In some embodiments, gradual degradation may also reduce perceptible flicker from one region to the next.

Advantageously, some embodiments may provide adaptive foveated encode quality. For example, a central region or focus region may have high quality encoding and edge regions may have lower quality encoding. Some embodiments may identify a focus area and provide higher encode quality at the focus area and lower encode quality outside the focus area.

Some embodiments may provide multiple bands of decreasing encode quality moving further away from the focus area and may encode at low quality for the outermost band. For example, the focus area gets the higher quality encoding and moving out from the focus area, each additional band or threshold has the encode quality adjusted lower. During encoding, a parameter may be set to indicate the encode quality for each band (e.g., a different QP value for each band).

In some embodiments, a media pipeline including a media engine may perform the encoding. The focus area (e.g., eye location) and macroblock location may both be known at the time of encoding. For each macroblock, there may be a parameter that indicates how far it is from the focus area. Alternatively, the media engine may calculate how far the macroblock is from the focus area and reduce the encode quality based on the calculation (e.g., may use a higher QP value for the further out macroblocks). Some embodiments may be implemented in the media pipeline after the rendering operations have completed. Compute threads may be dispatched to post-process the raster image. For example, a shader unit may run compute shaders to determine the distance of each macroblock from the focus area to determine which region each macroblock belongs to and set a corresponding parameter.

Some embodiments may advantageously provide visual quality adaptive foveated encoding for VR streaming. Non-limiting applications for some embodiments may include AR, VR, merged reality, mixed reality, computer generated holography, VR gaming, auto infotainment, automated driver assistance systems, HOLOLENS-type applications. Some wired VR systems may have problems with mobility (e.g., because the HMD may be tethered to a base system) and/or cost (e.g., because of the complex graphics operations involved). Some wireless VR systems may have problems with network bandwidth (e.g., because of the amount of data that needs to be transmitted) and/or image quality (e.g., because the bitrate may be lowered to support the available bandwidth). In order to improve the visual quality of VR streaming, some wireless VR systems may use high bandwidth wireless technology (e.g., 60 GHz wireless technology may provide 4 Gbps data bandwidth). But such high bandwidth systems cost more and may require proprietary wireless adapters not natively supported by many user devices. Some embodiments may advantageously provide adaptive foveated encoding based on focus information to improve the quality in a focus area while reducing the bandwidth requirements outside the focus area.

The visual quality may very important to various VR experiences. Some embodiments may support at least 2560× 1440 resolution for a dual eye VR system. In order to have a better visual quality, some embodiments may provide a bitrate of at least 80 Mbps for a 2560×1440 display. The perceived latency may be very important to the user experience. Higher bitrate may introduce extra latency. In order to have a low latency network transmission, some embodiments may utilize the user datagram protocol (UDP) based network transport protocol to provide a very low transmission overhead (e.g., as compared to transmission control protocol (TCP)). With a UDP mechanism, the group of picture (GOP) size may be limited. Some embodiments may utilize an intra-frame only encoding policy. One challenge of VR content streaming is how to get a good visual quality based on the limited bitrates budget (e.g., 80 Mbps@60 FPS with 2560×1440 resolution) and a limited GOP size. Some embodiments may advantageously provide a visual quality adaptive foveated encoding to improve the visual quality in a very limited network bandwidth while not sacrificing the user experience.

Some other encoding techniques may process the whole frame equally, and assign the same QP for all macroblocks. Some embodiments may advantageously provide multiple quality levels based on the fovea visual model. The multiple quality levels may be based on the human eye which is much more sensitive to the fovea area. Some embodiments may maintain the fovea area quality while decreasing the quality for the far peripheral area. By doing so, some embodiments may guarantee the visual quality within the target bitrates. Some embodiments may also change the GOP size adaptively based on the quality. In particular, some embodiments may achieve higher visual quality with limited network bandwidth (e.g., <100 Mbps WIFI networking), which may lower the cost and/or complexity of the needed hardware configurations to support VR applications. Some embodiments may be readily adapted to follow existing codec standards, without any special change at the receiving side. Some embodiments may be applied to VR applications on the cloud WIGIG based wireless streaming, and wired streaming applications (e.g., ETHERNET, USB, etc.).

Figure 16:
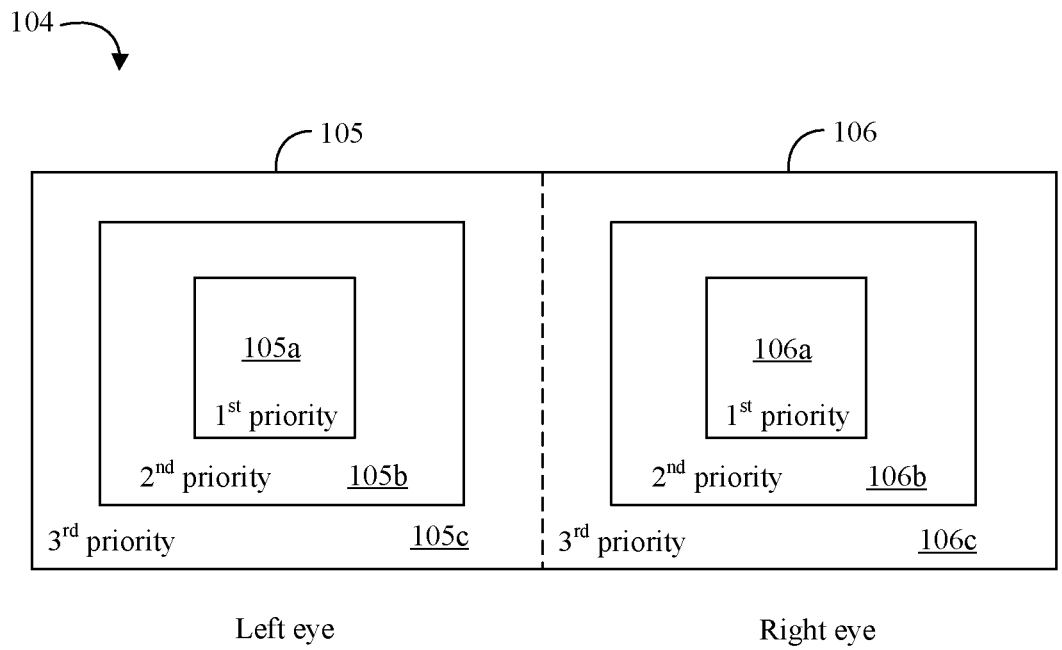
FIG. 16 is a block diagram of an example of a stereo virtual reality display according to an embodiment.

Turning now to FIG. 16, a dual-eye system 104 may include a left eye display region 105 and a right eye display region 106. Without being limited to theory of operation, the human visual system may include fovea vision and periphery vision. The area on the retina corresponding to the center of gaze, called the fovea, may have a higher density of cones than anywhere else on the retina. In the fovea, the retinal ganglion cells may have smaller receptive fields, and in the periphery, they may have much larger receptive fields. On the HMD display, the human eye visual system may follow the fovea visual system, with the user being more sensitive to the fovea area quality while not as sensitive to the far peripheral area quality. Some VR scenes may be very complex, and may be difficult to compress with low bitrates. Some embodiments may advantageously use higher bitrates for the fovea area. In order to simplify the human vision system, some embodiments may divide the quality of the whole VR content into three levels. A first priority quality area 105a, 106a may include the fovea area and a near peripheral area (e.g., +30 degrees, −30 degrees). Because the user may be most sensitive to this area, some embodiments may guarantee the quality of this area 105a, 106a. A second priority quality area 105b, 106b may include a mid-peripheral area. Compared with the first priority quality area 105a, 106a, the quality will be worse for the second priority area. A third priority quality area 105c, 106c may include a far peripheral area. The area 105c, 106c may have the relatively worst quality for the whole VR content, because the user may not be sensitive to this area 105c, 106c.

Figure 17:
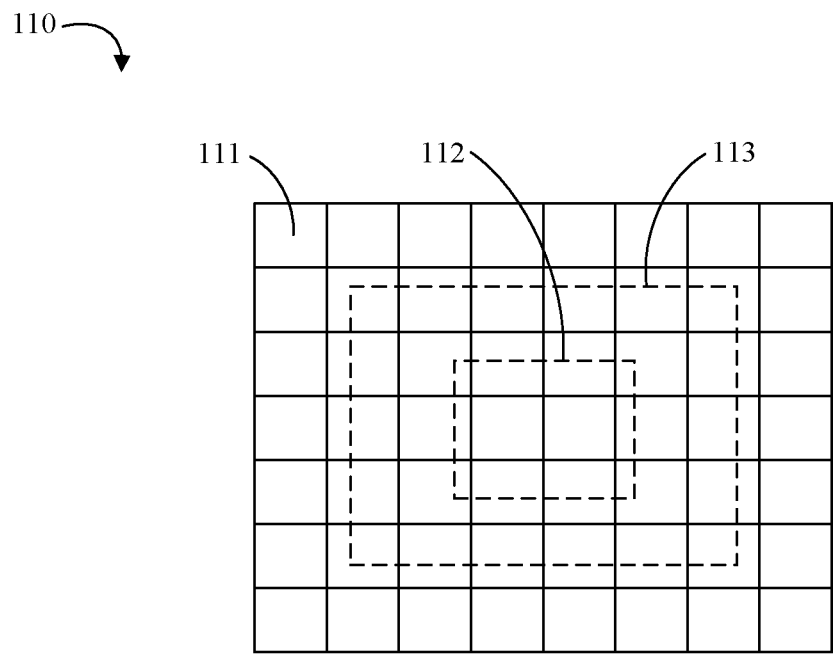
FIG. 17 is an illustrative diagram of an example of a grid of macroblocks superimposed on foveated regions according to an embodiment.

Turning now to FIG. 17, an image area 110 may be divided into macroblock 111 for encoding. Some embodiments may include more or fewer macroblocks. In some embodiments, the macroblocks may not be uniformly sized. In some embodiments, for example, the macroblocks located towards to the periphery may be larger than the macroblocks located near the focus area. Some embodiments may identify a focus area 112 and may provide higher quality encoding for macroblocks in the focus area 112. Some embodiments may include only the macroblocks entirely within the focus area 112 for the highest quality encoding, while some embodiments may additionally include any macroblock which intersects the focus area 112 for the highest quality encoding. Some embodiments may identify a second area 113 outside the focus area 112 and adjust the encoding quality to lower quality encoding for macroblocks in the second area 113 but outside the focus area 112 (e.g., lower quality encoding as compared to the highest quality encoding). Some embodiments may include only the macroblocks entirely within the second area 113 for the lower quality encoding, while some embodiments may additionally include any macroblock which intersects the second area 113 for the lower quality encoding. Some embodiments may adjust the encoding quality for macroblocks outside the focus area 112 and outside the second area 113 to the relatively lowest encoding quality.

Figure 18:
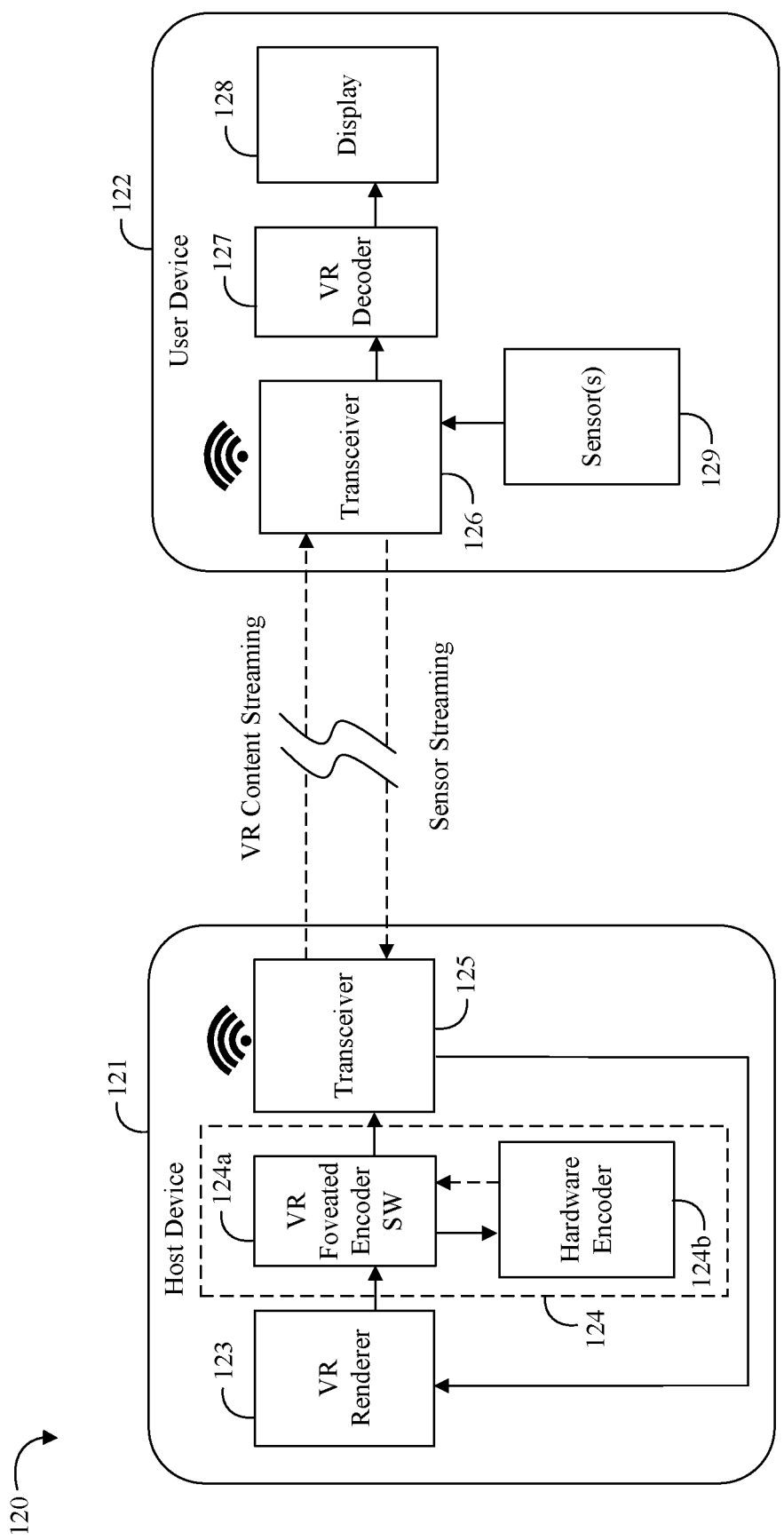
FIG. 18 is a block diagram of another example of an electronic processing system according to an embodiment.

Turning now to FIG. 18, an embodiment of an electronic processing system 120 may include a host device 121 (e.g., a personal computer, a server, etc.) communicatively coupled to a user device 122 (e.g., a smartphone, a tablet, a HMD, etc.), wired or wirelessly. The host device 121 may include a VR renderer 123 (e.g., a high performance graphics adapter) communicatively coupled to an adaptive encoder 124, which in turn may be communicatively coupled to a transceiver 125 (e.g., WIFI, WIGIG, ETHERNET, etc.). For example, the adaptive encoder 124 may utilize advanced video coding (AVC) and/or high-efficiency video coding (HEVC) and may performed by a graphics processor or external graphics adapter. The user device 122 may include a transceiver 126 (e.g., configured to exchange information with the transceiver 125 of the host device 121) communicatively coupled to a VR decoder 127, which in turn is communicatively coupled to a display 128. The user device 122 may further include one or more sensors 129. The adaptive encoder 124 may include VR foveated encoder software 124a communicatively coupled to a hardware encoder 124b.

The host device 121 may include one or more GPUs which implement all or portions of the VR renderer 123 and the adaptive encoder 124. The host device 121 may render VR graphics/video image content, encode that content and stream the VR content to the user device 122. The user device 122 may decode the VR content and present the graphics/video image on the display 128. The user device may also support other local functions such as asynchronous time warp (ATW), frame buffer rendering (FBR), barrel distortion correction, etc. In accordance with some embodiments, the user device 122 may provide sensor-related information back to the host device 121 for advantageous utilization by the adaptive encoder 124 as described herein. For example, the user device 122 may transmit the HMD position, 3 DOF information, 6 DOF information, and/or other sensor data back to the host device 121. For example, the adaptive encoder 124 may also include an adaptive motion encoder as described herein to adjust one or more video encode parameters based on the sensor-related information received from the user device 122.

Some embodiments of the system 120 may advantageously guarantee the visual quality, no matter what the scene is, by providing quality adaptive foveated encoding to improve the visual quality. For example, the hardware encoder 124b at the transmitter side may report frame level QP for every frame. Based on the reported previous frame level QP, the VR foveated encoder software 124a may have a general guidance for the level quality. For example, if the QP is about 41, the quality may be pretty bad which may impact the user experience. If the QP is around 25 or below, the quality may be acceptable and no changes may be needed. The VR foveated encoder software 124a may then generate a new set of QP differences/changes (deltaQP) for both the first priority region and the second priority region. Additionally, or alternatively, the VR foveated encoder software 124a may adjust the GOP size. In some embodiments, the real QP value for the first and second priority regions may be determined as follows:

$$\text{QP of 1st/2nd region} = \text{deltaQP of 1st/2nd region} + \text{frame level QP} \quad [\text{Eq. 8}]$$

If the deltaQP is less than 0, the quality may be adjusted to be better than other regions.

The network package may sometimes be dropped in a wireless environment. Some embodiments may utilize an intra-frame only encoding for the wireless environment. If the VR scene is too complex to be compressed with good quality, some embodiments may increase the GOP size to provide a good quality because the inter-frame reference may be leveraged to have a better compression ratio. Some embodiments may maintain the GOP size to be less than 4 to avoid corruption or long motion to photon effect and improve the VR experience. Advantageously, some embodiments may only impact the encoder side, without any special change at the receiver side.

Figure 19:
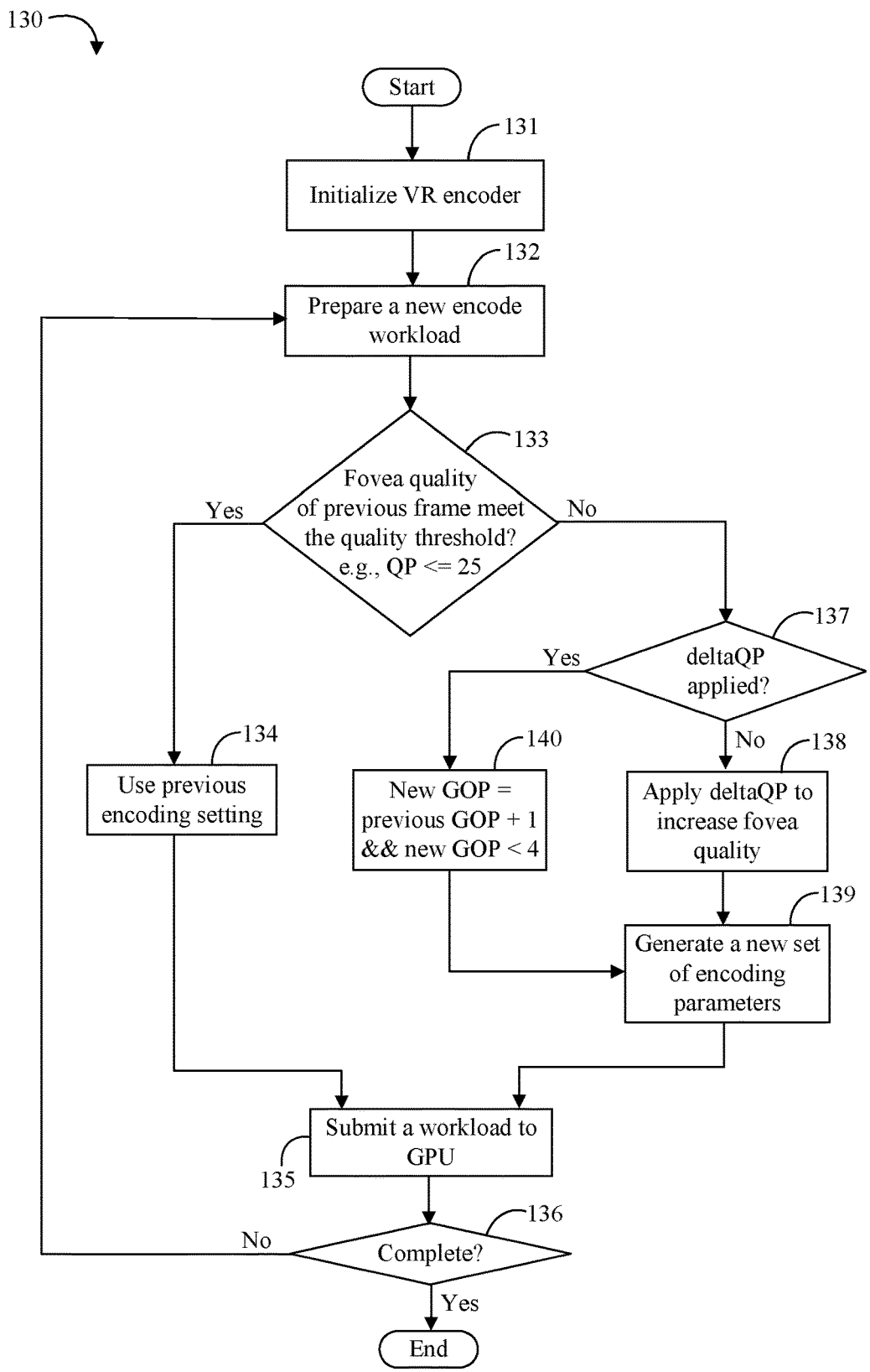
FIG. 19 is a flowchart of another example of a method of adaptive encoding according to an embodiment.

Turning now to FIG. 19, a method 130 of adaptive encoding may include initializing the VR encoder at block 131 and preparing a new encode workload at block 132. When the VR encoder SW starts to prepare a new encoding workload, it may check the encoding statistics data from the previous encoded frame (e.g, the frame level QP of the previous frame). If the fovea area QP (frame level QP+deltaQP)<=the threshold QP at block 133, then the VR encoder SW may apply the same setting as the previous frame at block 134 (e.g., at the very beginning, the deltaQP may be set to −1 by default). The method 130 may then submit a workload to the GPU at block 135. The method 130 may then determine if all the encoding is complete at block 136 and, if not, may prepare the next encode workload at block 132.

If the fovea QP is larger than the threshold QP at block 133, the method 130 may determine whether there is room to adjust the deltaQP at block 137. For example, if the frame level QP is less than a maximum QP (e.g., QP=51), then there may still be room to change the deltaQP. Otherwise, there may be no room to adjust the deltaQP within the target bitrates. If there is still room to adjust deltaQP, the deltaQP may be made much smaller to make sure the fovea has better quality. If the deltaQP has not been applied at block 137, the method 130 may apply the deltaQP at block 138 to increase the fovea quality at block 138 and generate a new set of encoding parameters at block 139. The method 130 may then submit a workload to the GPU at block 135. The method 130 may then determine if all the encoding is complete at block 136 and, if not, may prepare the next encode workload at block 132.

If the deltaQP has been applied at block 137, then the VR encoder may try to use more P frames instead of I frames only at block 140 (e.g., new GOP=previous GOP+1 && new GOP<4) and generate a new set of encoding parameters at block 139. In some embodiments, the new GOP may be constrained to a maximum threshold (e.g., GOP less than 4), to avoid longer motion to photon latency due to package loss. If the VR encoder finds that the fovea area quality already meets the target, and it can be adjusted through deltaQP, then it may try to reduce the GOP size to check the quality once more. The method 130 may then submit a workload to the GPU at block 135. The method 130 may then determine if all the encoding is complete at block 136 and, if not, may prepare the next encode workload at block 132.

In some embodiments, a conservative setting of the deltaQP may make sure the far peripheral may also have good quality. In such a setting, the foveated encoding may have an about 1.5 db to 3 dB quality improvement at the fovea area in 1024×1024@60 fps at a 6 Mbps bitrate as compared to applying the same QP to every macroblock. If a more aggressive deltaQP is applied, there may be even better quality improvement in the fovea area.

System Overview

Figure 20:
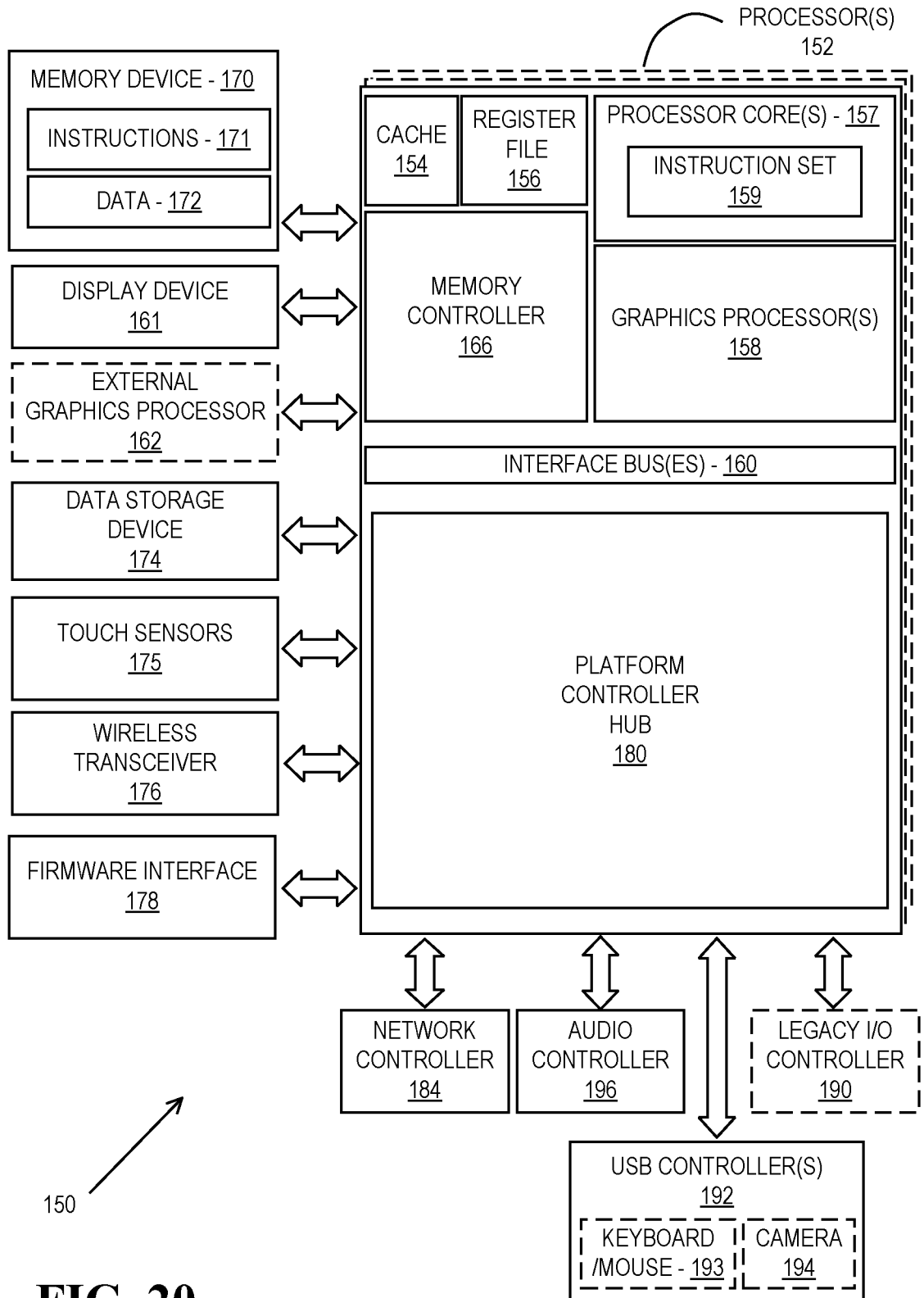
FIG. 20 is a block diagram of an example of a processing system according to an embodiment.

FIG. 20 is a block diagram of a processing system 150, according to an embodiment. In various embodiments the system 150 includes one or more processors 152 and one or more graphics processors 158, and may be a single processor desktop system, a multiprocessor workstation system, or a server system having a large number of processors 152 or processor cores 157. In one embodiment, the system 150 is a processing platform incorporated within a system-on-a-chip (SoC) integrated circuit for use in mobile, handheld, or embedded devices.

In one embodiment the system 150 can include, or be incorporated within a server-based gaming platform, a game console, including a game and media console, a mobile gaming console, a handheld game console, or an online game console. In some embodiments the system 150 is a mobile phone, smart phone, tablet computing device or mobile Internet device. The processing system 150 can also include, couple with, or be integrated within a wearable device, such as a smart watch wearable device, smart eyewear device, augmented reality device, or virtual reality device. In some embodiments, the processing system 150 is a television or set top box device having one or more processors 152 and a graphical interface generated by one or more graphics processors 158.

In some embodiments, the one or more processors 152 each include one or more processor cores 157 to process instructions which, when executed, perform operations for system and user software. In some embodiments, each of the one or more processor cores 157 is configured to process a specific instruction set 159. In some embodiments, instruction set 159 may facilitate Complex Instruction Set Computing (CISC), Reduced Instruction Set Computing (RISC), or computing via a Very Long Instruction Word (VLIW). Multiple processor cores 157 may each process a different instruction set 159, which may include instructions to facilitate the emulation of other instruction sets. Processor core 157 may also include other processing devices, such a Digital Signal Processor (DSP).

In some embodiments, the processor 152 includes cache memory 154. Depending on the architecture, the processor 152 can have a single internal cache or multiple levels of internal cache. In some embodiments, the cache memory is shared among various components of the processor 152. In some embodiments, the processor 152 also uses an external cache (e.g., a Level-3 (L3) cache or Last Level Cache (LLC)) (not shown), which may be shared among processor cores 157 using known cache coherency techniques. A register file 156 is additionally included in processor 152 which may include different types of registers for storing different types of data (e.g., integer registers, floating point registers, status registers, and an instruction pointer register). Some registers may be general-purpose registers, while other registers may be specific to the design of the processor 152.

In some embodiments, one or more processor(s) 152 are coupled with one or more interface bus(es) 160 to transmit communication signals such as address, data, or control signals between processor 152 and other components in the system 150. The interface bus 160, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 152 include an integrated memory controller 166 and a platform controller hub 180. The memory controller 166 facilitates communication between a memory device and other components of the system 150, while the platform controller hub (PCH) 180 provides connections to I/O devices via a local I/O bus.

The memory device 170 can be a dynamic random access memory (DRAM) device, a static random access memory (SRAM) device, flash memory device, phase-change memory device, or some other memory device having suitable performance to serve as process memory. In one embodiment the memory device 170 can operate as system memory for the system 150, to store data 172 and instructions 171 for use when the one or more processors 152 executes an application or process. Memory controller 166 also couples with an optional external graphics processor 162, which may communicate with the one or more graphics processors 158 in processors 152 to perform graphics and media operations. In some embodiments a display device 161 can connect to the processor(s) 152. The display device 161 can be one or more of an internal display device, as in a mobile electronic device or a laptop device or an external display device attached via a display interface (e.g., DisplayPort, etc.). In one embodiment the display device 161 can be a head mounted display (HMD) such as a stereoscopic display device for use in virtual reality (VR) applications or augmented reality (AR) applications.

In some embodiments the platform controller hub 180 enables peripherals to connect to memory device 170 and processor 152 via a high-speed I/O bus. The I/O peripherals include, but are not limited to, an audio controller 196, a network controller 184, a firmware interface 178, a wireless transceiver 176, touch sensors 175, a data storage device 174 (e.g., hard disk drive, flash memory, etc.). The data storage device 174 can connect via a storage interface (e.g., SATA) or via a peripheral bus, such as a Peripheral Component Interconnect bus (e.g., PCI, PCI Express). The touch sensors 175 can include touch screen sensors, pressure sensors, or fingerprint sensors. The wireless transceiver 176 can be a Wi-Fi transceiver, a Bluetooth transceiver, or a mobile network transceiver such as a 3G, 4G, or Long Term Evolution (LTE) transceiver. The firmware interface 178 enables communication with system firmware, and can be, for example, a unified extensible firmware interface (UEFI). The network controller 184 can enable a network connection to a wired network. In some embodiments, a high-performance network controller (not shown) couples with the interface bus 160. The audio controller 196, in one embodiment, is a multi-channel high definition audio controller. In one embodiment the system 150 includes an optional legacy I/O controller 190 for coupling legacy (e.g., Personal System 2 (PS/2)) devices to the system. The platform controller hub 180 can also connect to one or more Universal Serial Bus (USB) controllers 192 connect input devices, such as keyboard and mouse 193 combinations, a camera 194, or other USB input devices.

It will be appreciated that the system 150 shown is exemplary and not limiting, as other types of data processing systems that are differently configured may also be used. For example, an instance of the memory controller 166 and platform controller hub 180 may be integrated into a discrete external graphics processor, such as the external graphics processor 162. In one embodiment the platform controller hub 180 and/or memory controller 166 may be external to the one or more processor(s) 152. For example, the system 150 can include an external memory controller 166 and platform controller hub 180, which may be configured as a memory controller hub and peripheral controller hub within a system chipset that is in communication with the processor(s) 152.

Figure 21:
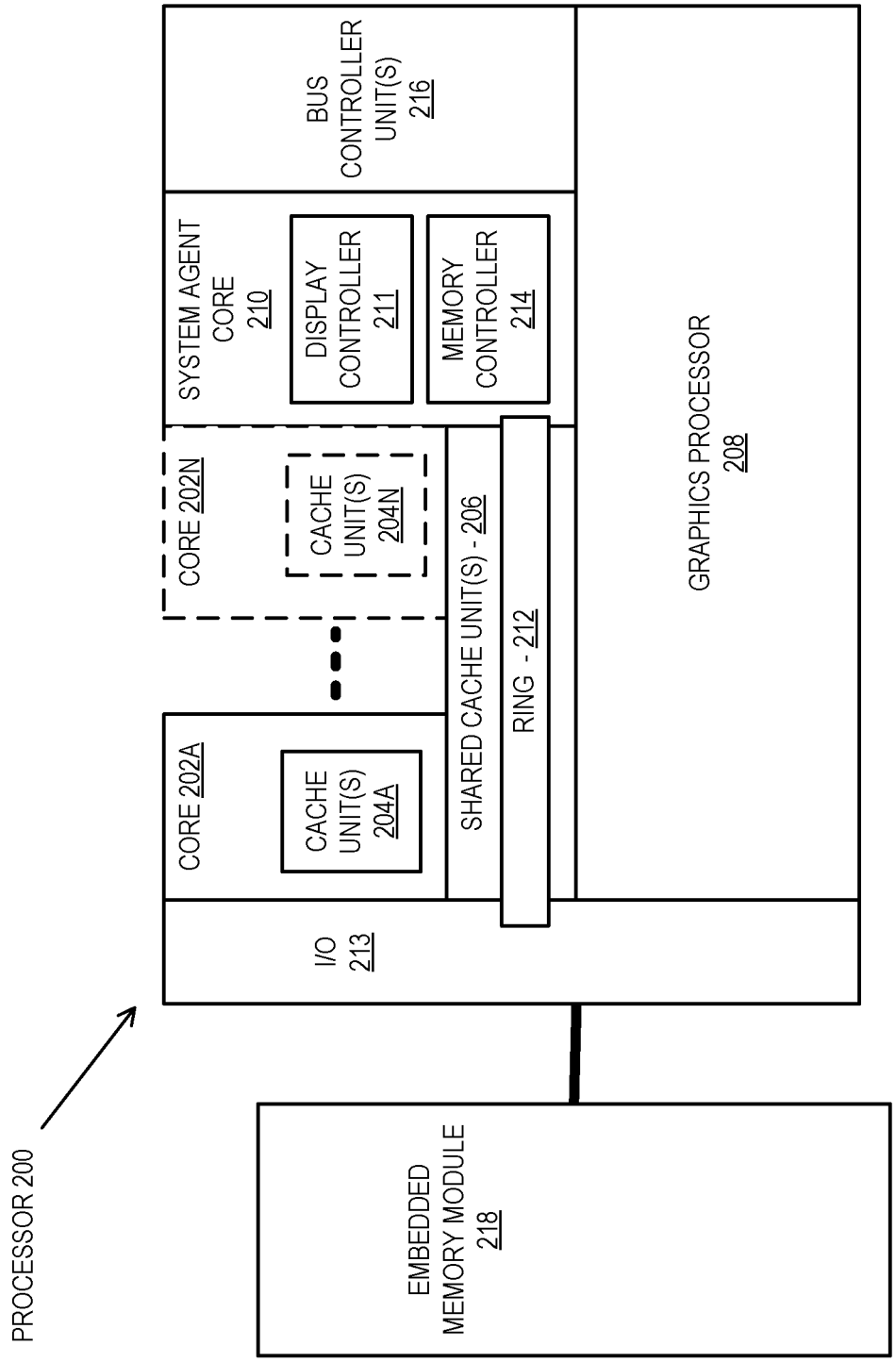
FIG. 21 is a block diagram of an example of a processor according to an embodiment.

FIG. 21 is a block diagram of an embodiment of a processor 200 having one or more processor cores 202A-202N, an integrated memory controller 214, and an integrated graphics processor 208. Those elements of FIG. 21 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring based interconnect unit 212 via an I/O link 213. The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 22:
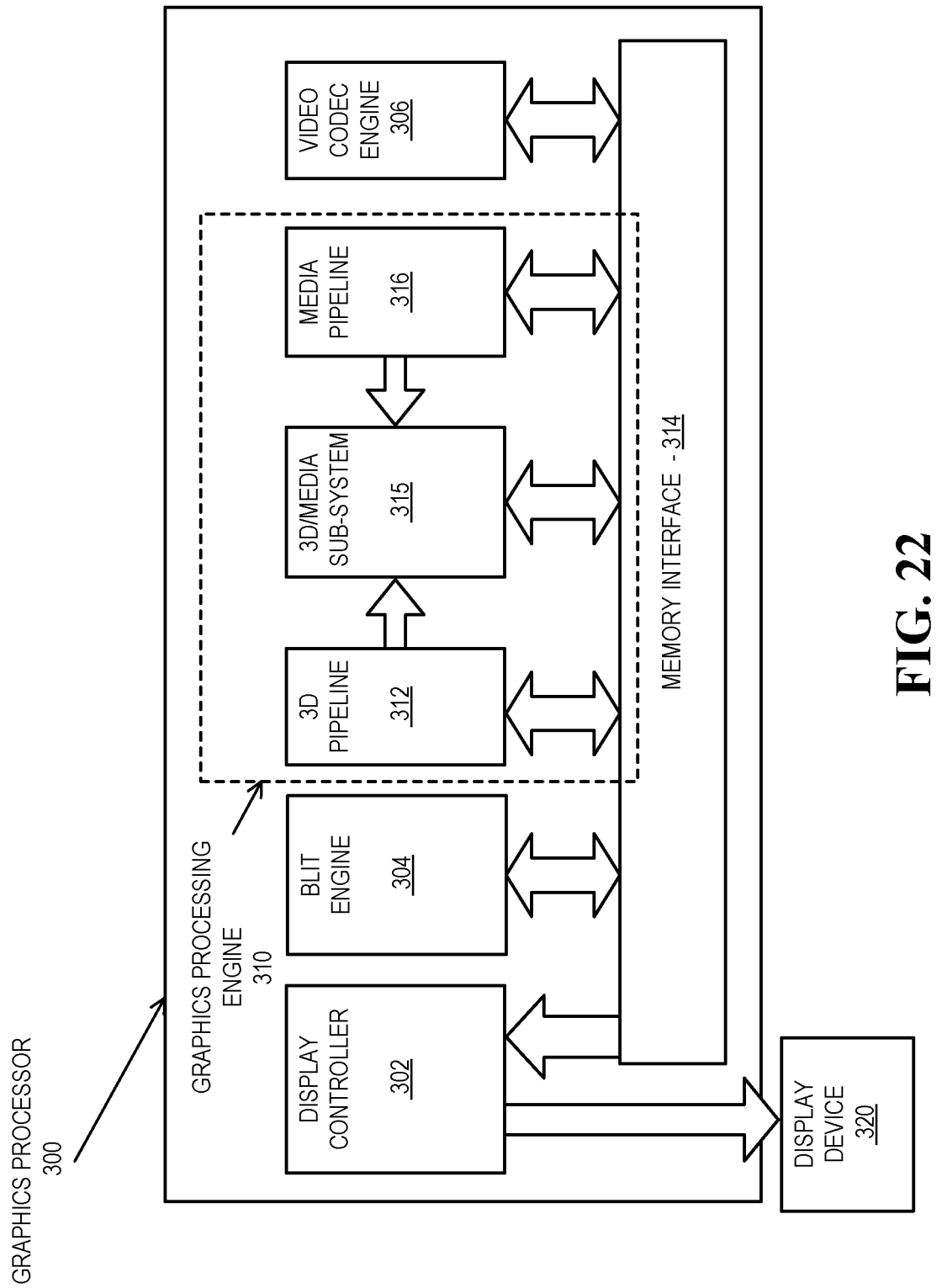
FIG. 22 is a block diagram of an example of a graphics processor according to an embodiment.

FIG. 22 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 23:
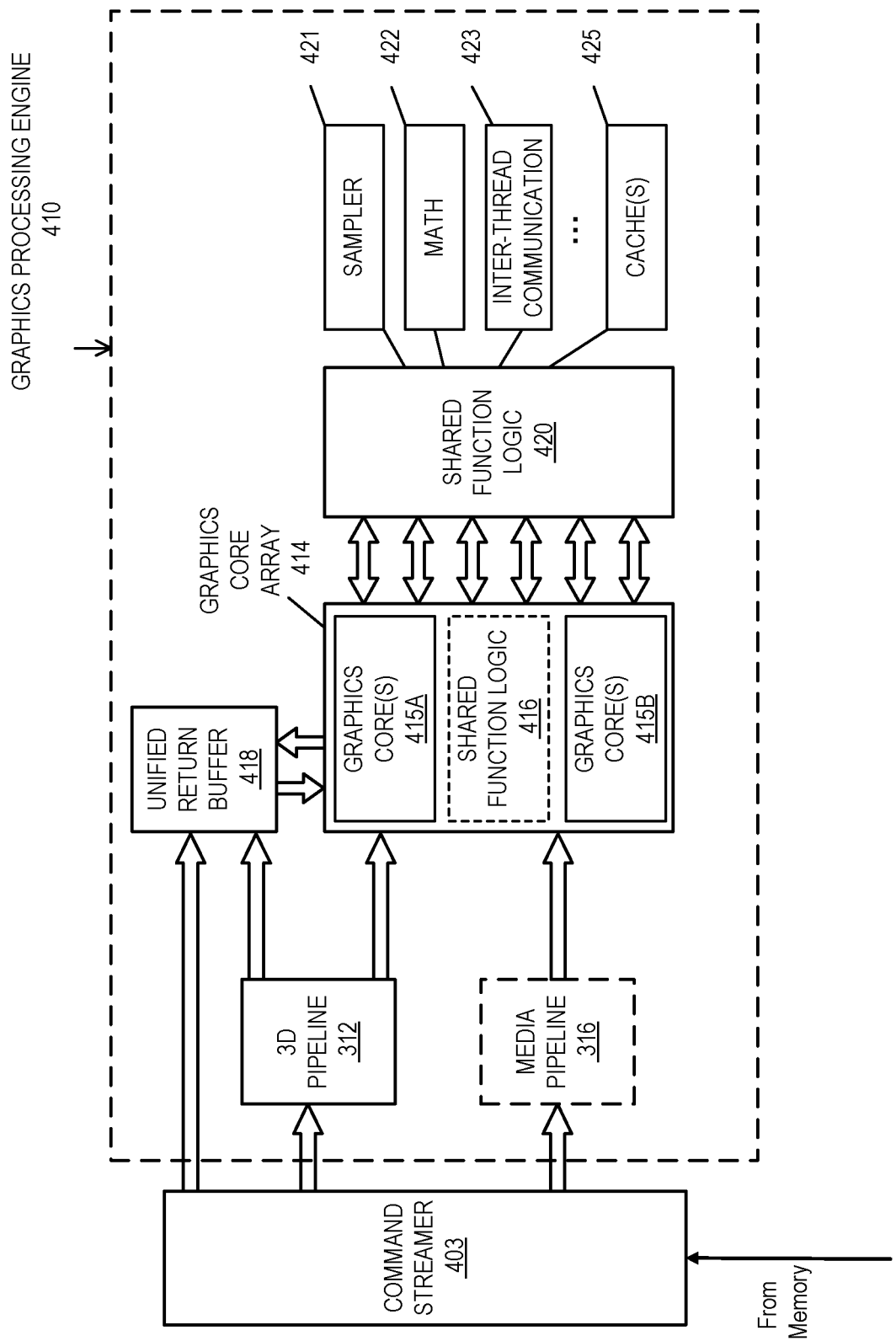
FIG. 23 is a block diagram of an example of a graphics processing engine of a graphics processor according to an embodiment.

FIG. 23 is a block diagram of a graphics processing engine 410 of a graphics processor in accordance with some embodiments. In one embodiment, the graphics processing engine (GPE) 410 is a version of the GPE 310 shown in FIG. 22. Elements of FIG. 23 having the same reference numbers (or names) as the elements of any other figure herein can operate or function in any manner similar to that described elsewhere herein, but are not limited to such. For example, the 3D pipeline 312 and media pipeline 316 of FIG. 22 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphics core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 157 of FIG. 20 or core 202A-202N as in FIG. GT-2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 24:
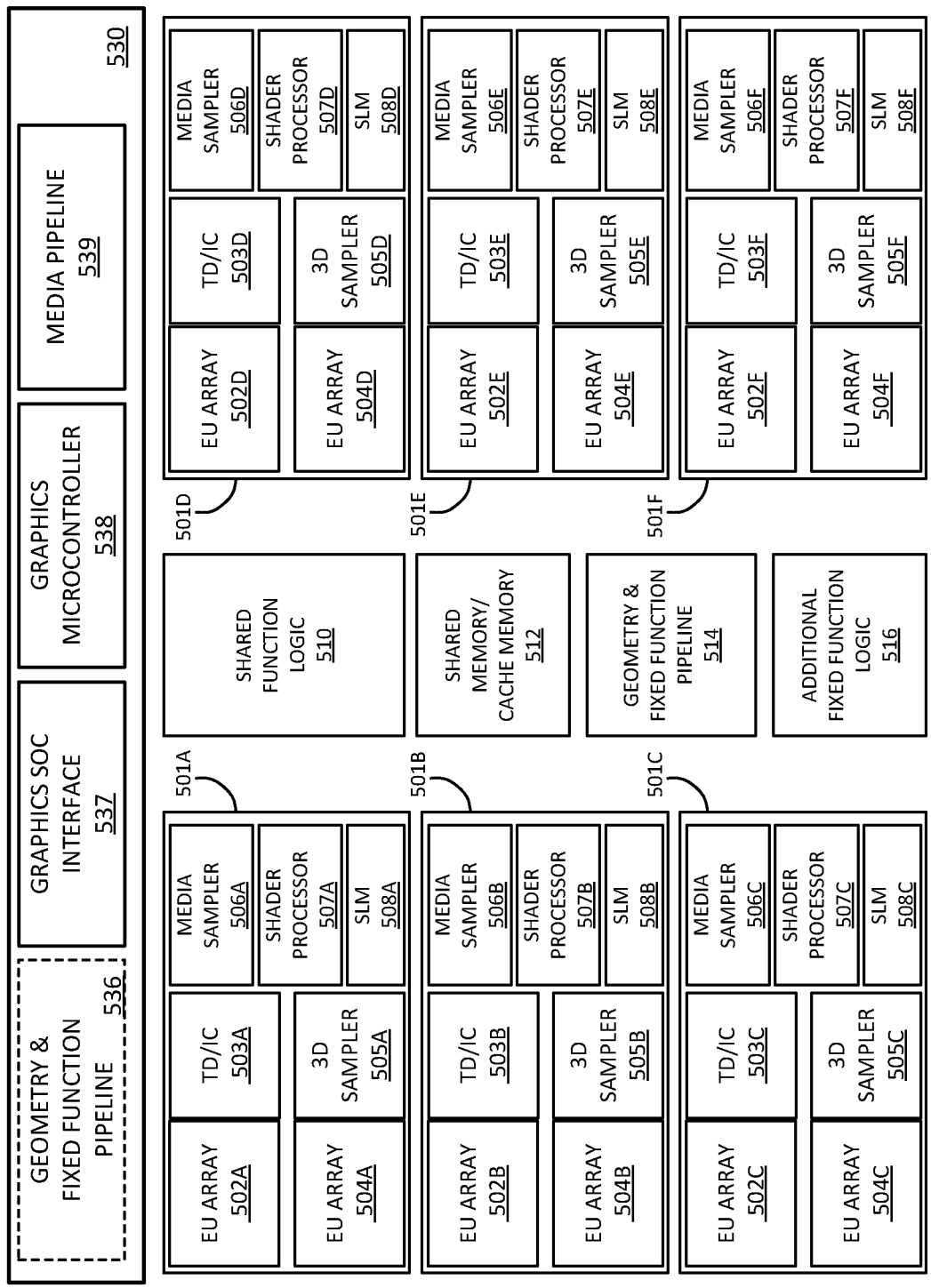
FIG. 24 is a block diagram of an example of hardware logic of a graphics processor core according to an embodiment.

FIG. 24 is a block diagram of hardware logic of a graphics processor core 500, according to some embodiments described herein. Elements of FIG. 24 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 23. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics core 500 can include a fixed function block 530 coupled with multiple sub-cores 501A-501F, also referred to as sub-slices, that include modular blocks of general-purpose and fixed function logic.

In some embodiments the fixed function block 530 includes a geometry/fixed function pipeline 536 that can be shared by all sub-cores in the graphics processor 500, for example, in lower performance and/or lower power graphics processor implementations. In various embodiments, the geometry/fixed function pipeline 536 includes a 3D fixed function pipeline (e.g., 3D pipeline 312 as in FIG. 22 and FIG. 23) a video front-end unit, a thread spawner and thread dispatcher, and a unified return buffer manager, which manages unified return buffers, such as the unified return buffer 418 of FIG. 23.

In one embodiment the fixed function block 530 also includes a graphics SoC interface 537, a graphics microcontroller 538, and a media pipeline 539. The graphics SoC interface 537 provides an interface between the graphics core 500 and other processor cores within a system on a chip integrated circuit. The graphics microcontroller 538 is a programmable sub-processor that is configurable to manage various functions of the graphics processor 500, including thread dispatch, scheduling, and pre-emption. The media pipeline 539 (e.g., media pipeline 316 of FIG. 22 and FIG. 23) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics core 500 and CPUs within the SoC. The SoC interface 537 can also implement power management controls for the graphics core 500 and enable an interface between a clock domain of the graphics core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics core 500, providing the graphics core 500 with the ability to save and restore registers within the graphics core 500 across low-power state transitions independently from the operating system and/or graphics driver software on the system.

The graphics core 500 may have greater than or fewer than the illustrated sub-cores 501A-501F, up to N modular sub-cores. For each set of N sub-cores, the graphics core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 23 (e.g., sampler, math, and/or inter-thread communication logic) that can be shared by each N sub-cores within the graphics core 500. The shared and/or cache memory 512 can be a last-level cache for the set of N sub-cores 501A-501F within the graphics core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics core 500 includes additional fixed function logic 516 that can include various fixed function acceleration logic for use by the graphics core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 25A:
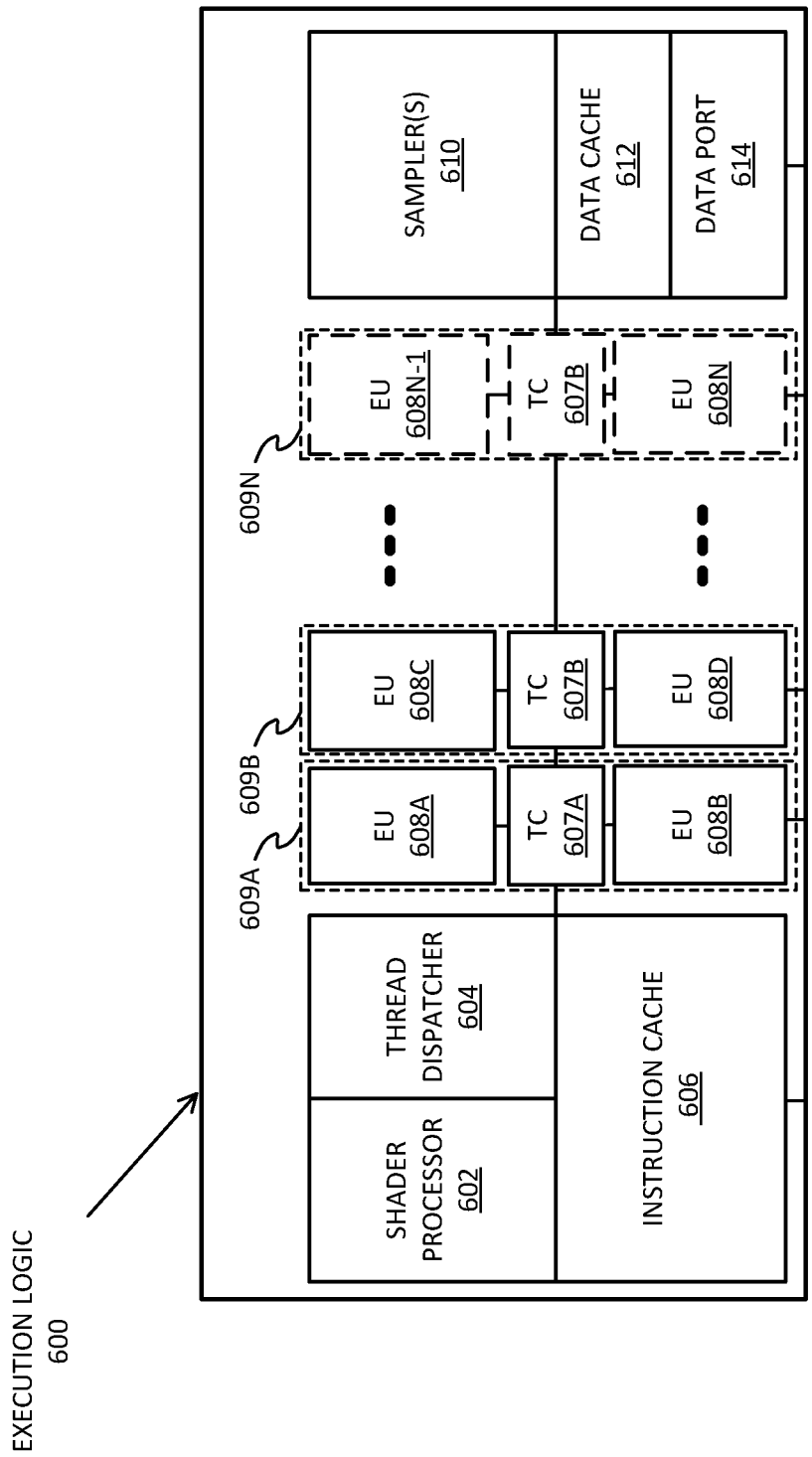
FIGS. 25A to 25B illustrate an example of thread execution logic according to an embodiment.
Figure 25B:
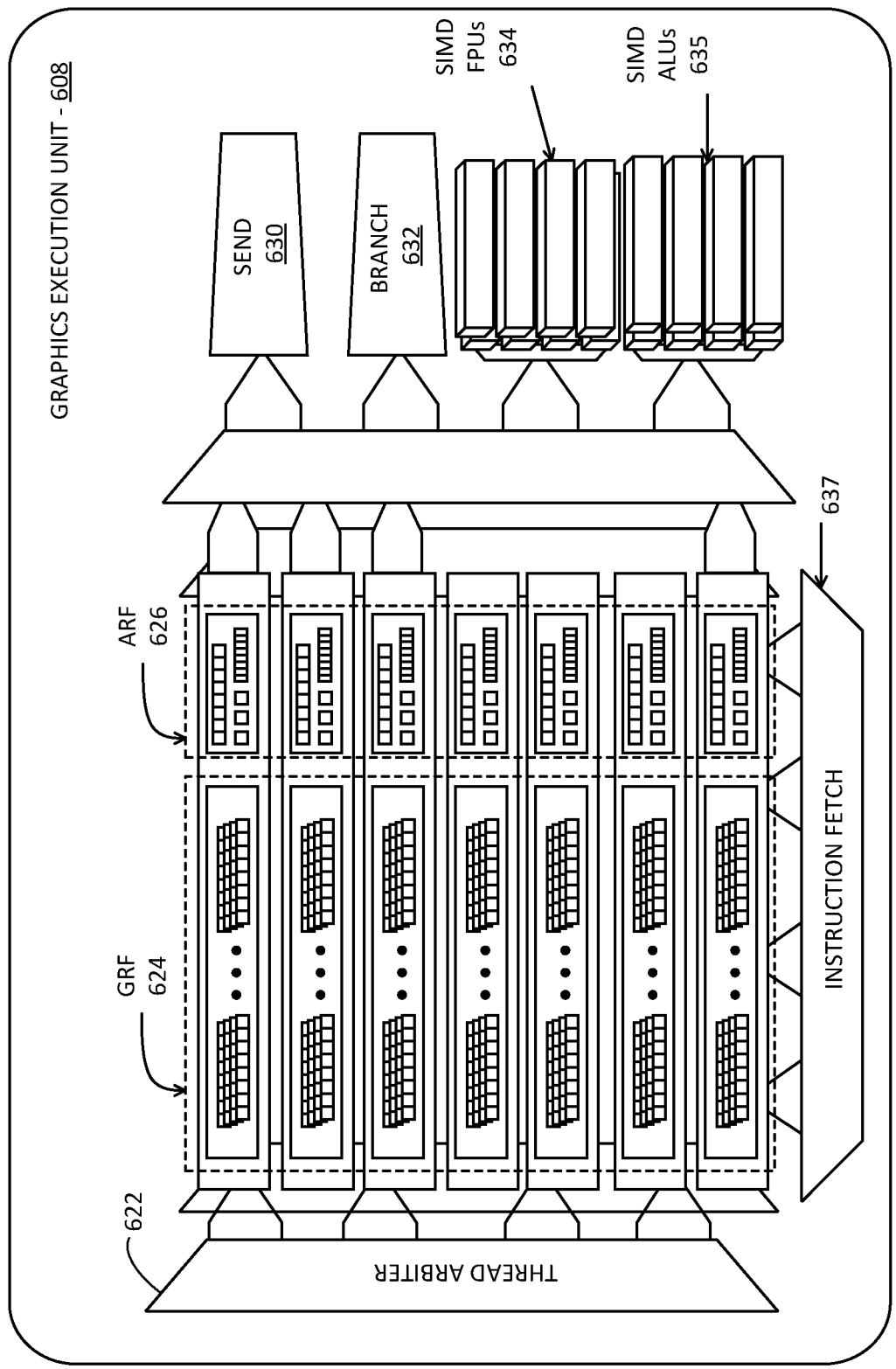

FIGS. 25A-25B illustrate thread execution logic 600 including an array of processing elements employed in a graphics processor core according to embodiments described herein. Elements of FIGS. 25A-25B having the same reference numbers (or names) as the elements of any other figure herein can operate or function in any manner similar to that described elsewhere herein, but are not limited to such. FIG. 25A illustrates an overview of thread execution logic 600, which can include a variant of the hardware logic illustrated with each sub-core 501A-501F of FIG. 24. FIG. 25B illustrates exemplary internal details of an execution unit.

As illustrated in FIG. 25A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g., 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 25B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit 608 can dispatch the instructions to one of the send unit 630, branch unit 642, or SIMD FPU(s) 634 for execution. Each execution thread can access 178 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can chose the exact number of execution units per sub-core grouping. In one embodiment the execution unit 608 can execute instructions across a plurality of execution channels. In a further embodiment, each thread executed on the graphics execution unit 608 is executed on a different channel.

Figure 26:
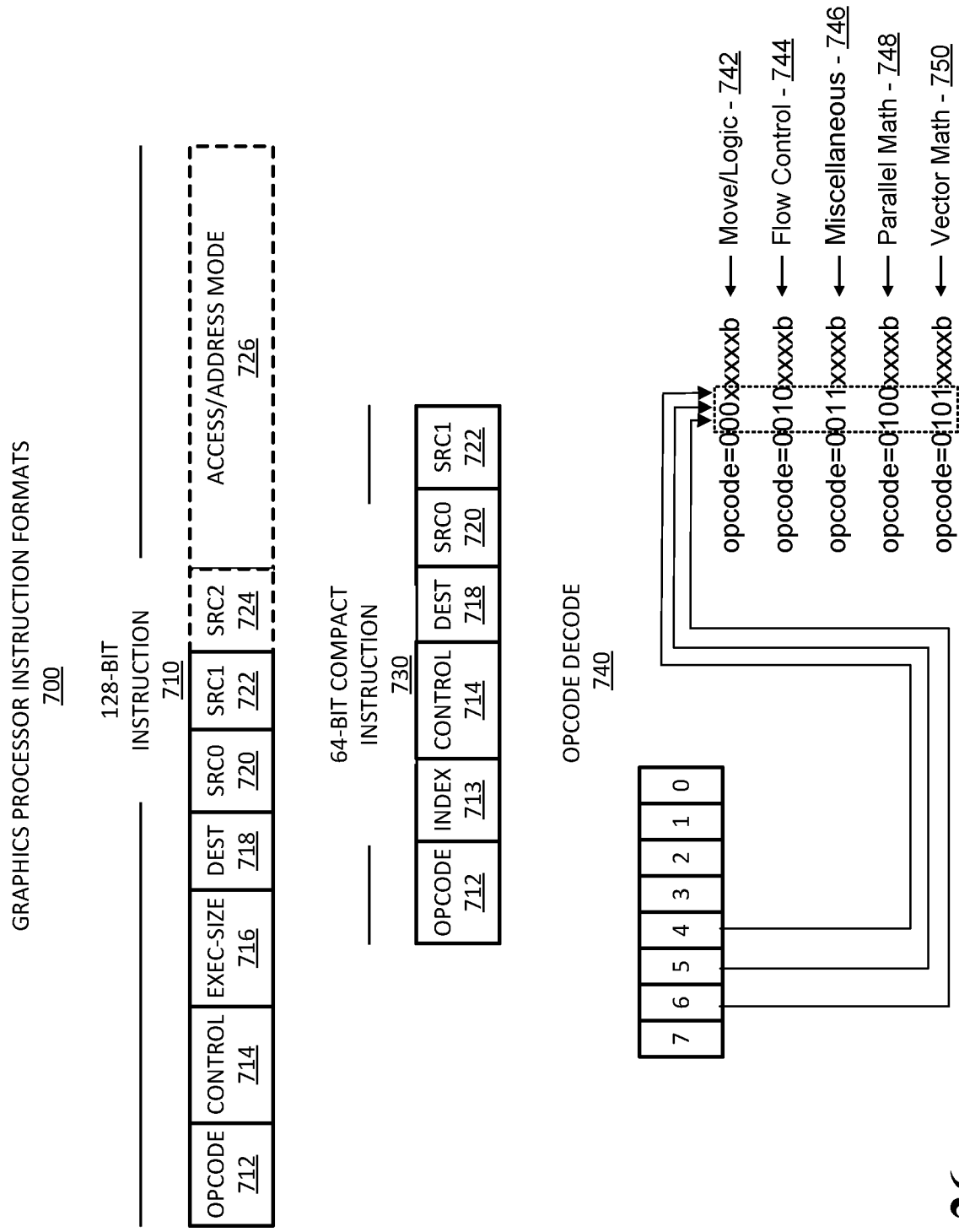
FIG. 26 is a block diagram illustrating an example of a graphics processor instruction formats according to an embodiment.

FIG. 26 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., prediction) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic opcode group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 27:
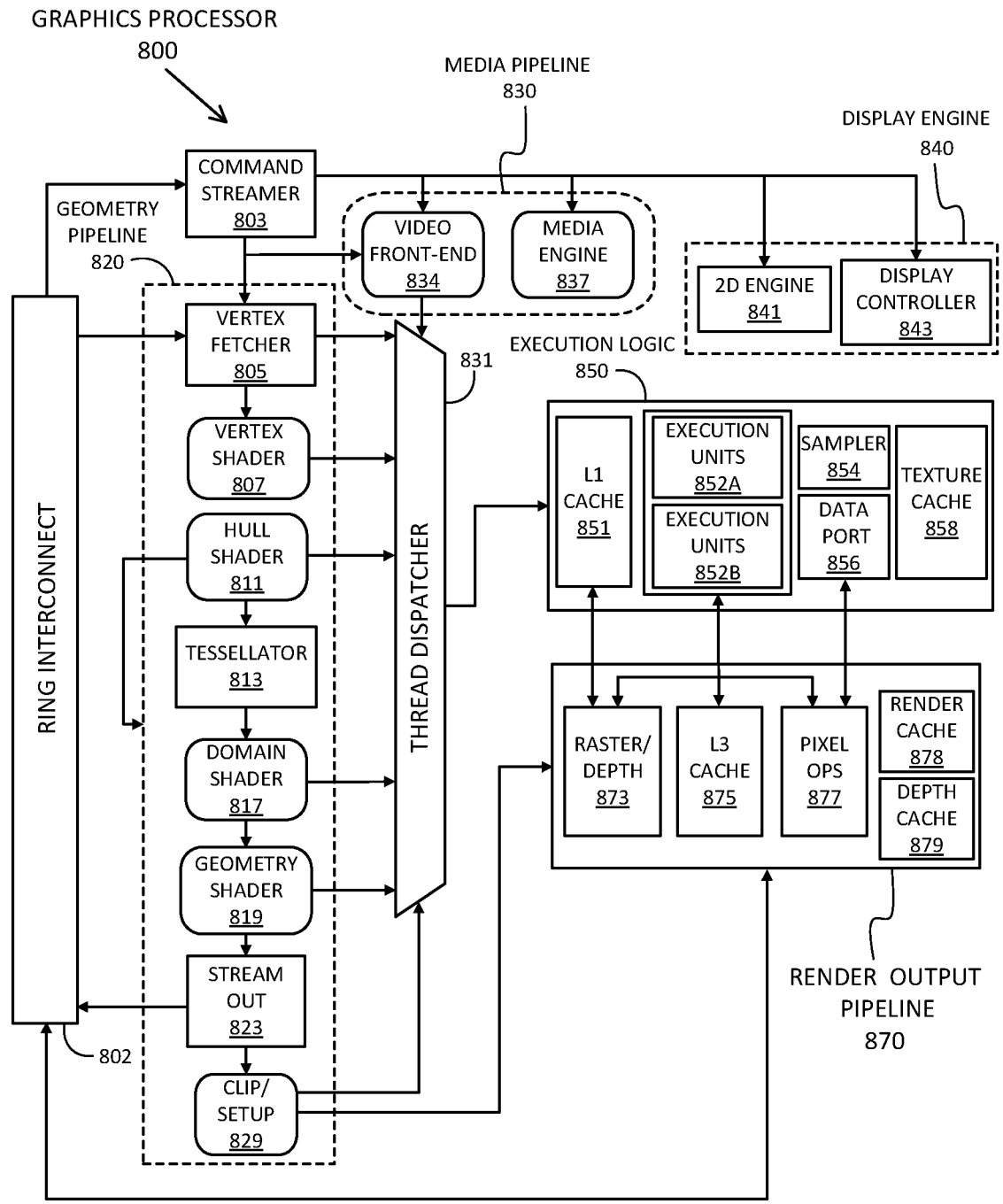
FIG. 27 is a block diagram of another example of a graphics processor according to an embodiment.

FIG. 27 is a block diagram of another embodiment of a graphics processor 800. Elements of FIG. 27 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g., bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 28A is a block diagram illustrating a graphics processor command format 900 according to some embodiments. FIG. 28B is a block diagram illustrating a graphics processor command sequence 910 according to an embodiment. The solid lined boxes in FIG. 28A illustrate the components that are generally included in a graphics command while the dashed lines include components that are optional or that are only included in a sub-set of the graphics commands. The exemplary graphics processor command format 900 of FIG. 28A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 28B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state commands 916 include selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 29:
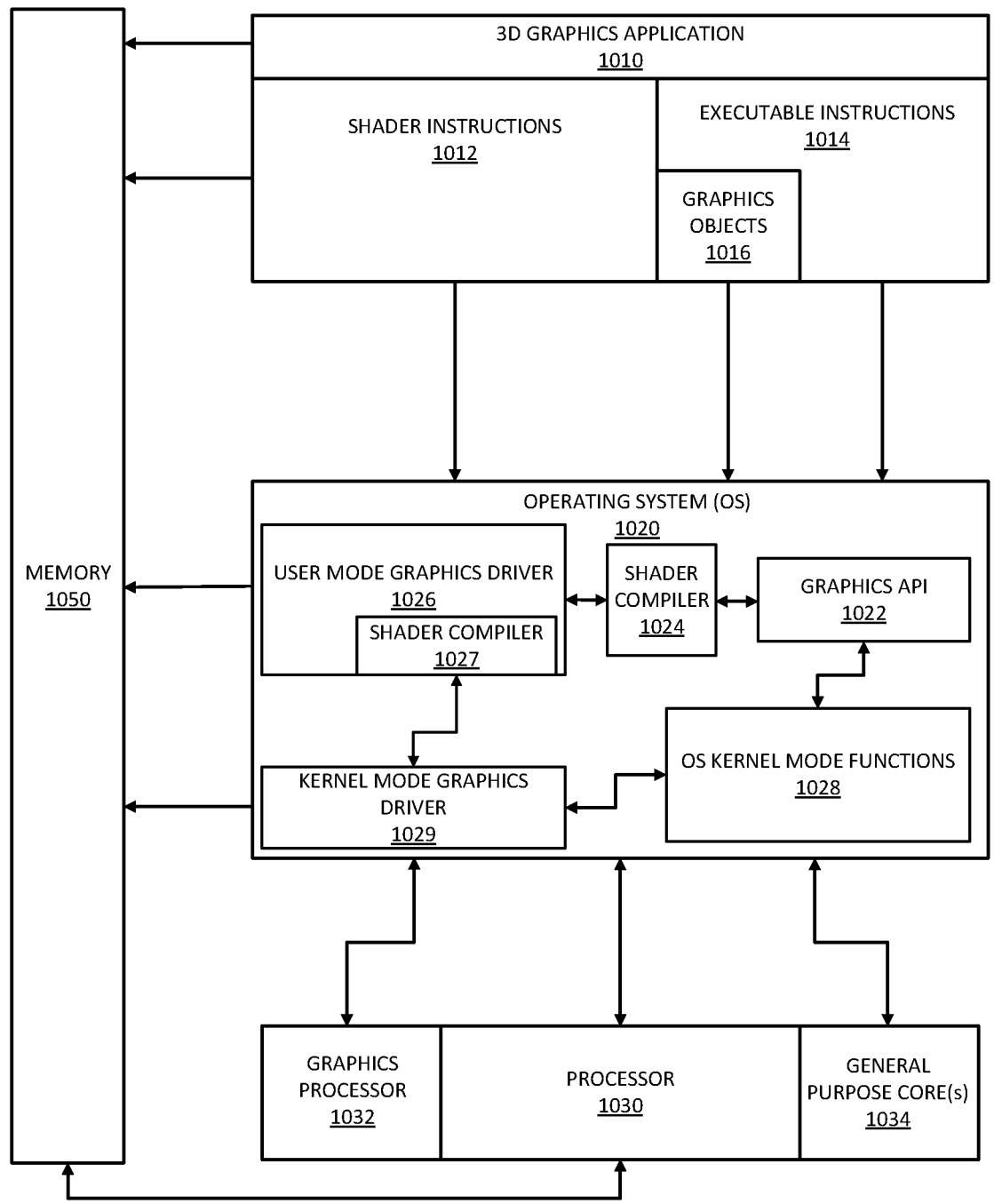
FIG. 29 illustrates an example graphics software architecture for a data processing system according to an embodiment.

FIG. 29 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 30A:
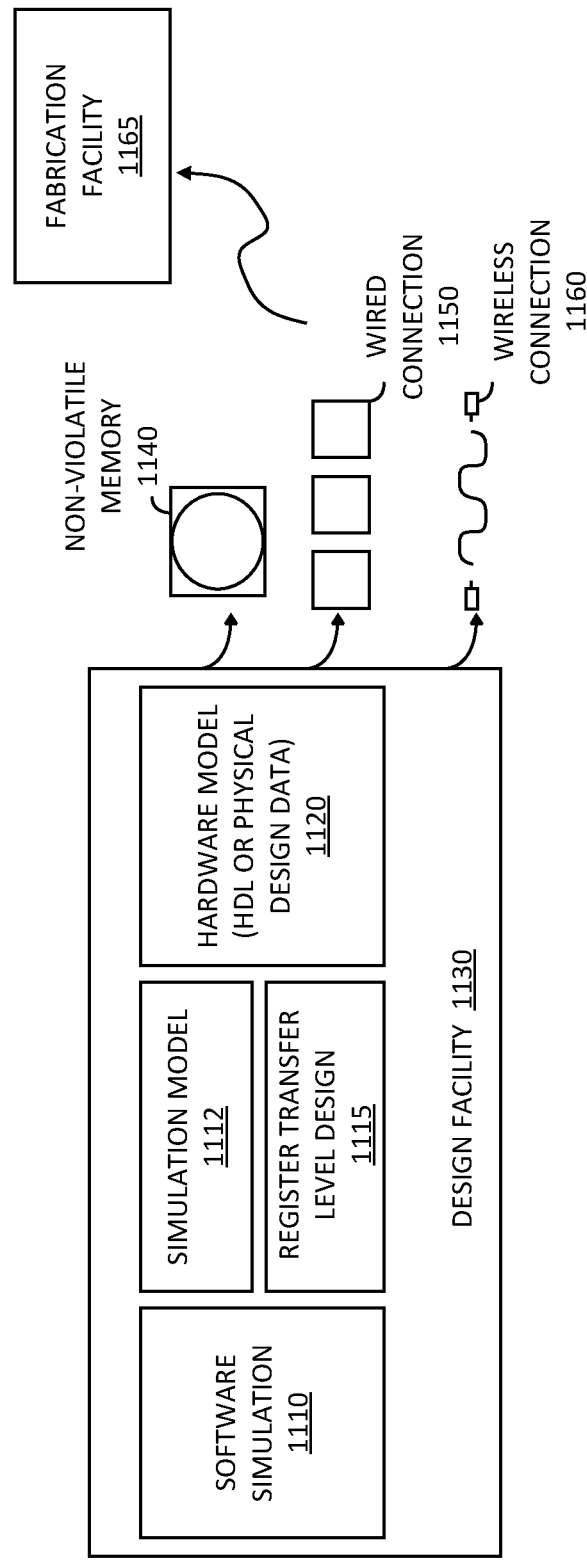
FIG. 30A is a block diagram illustrating an example of an IP core development system according to an embodiment.

FIG. 30A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design to facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 30B:
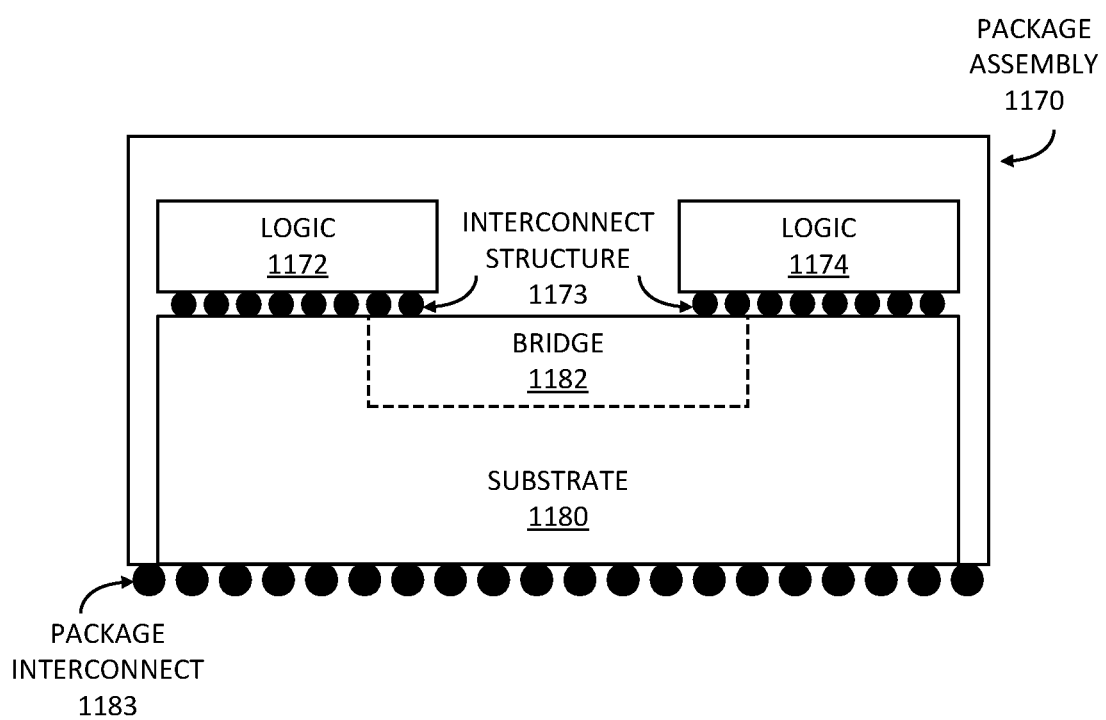
FIG. 30B illustrates an example of a cross-section side view of an integrated circuit package assembly according to an embodiment.

FIG. 30B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 31:
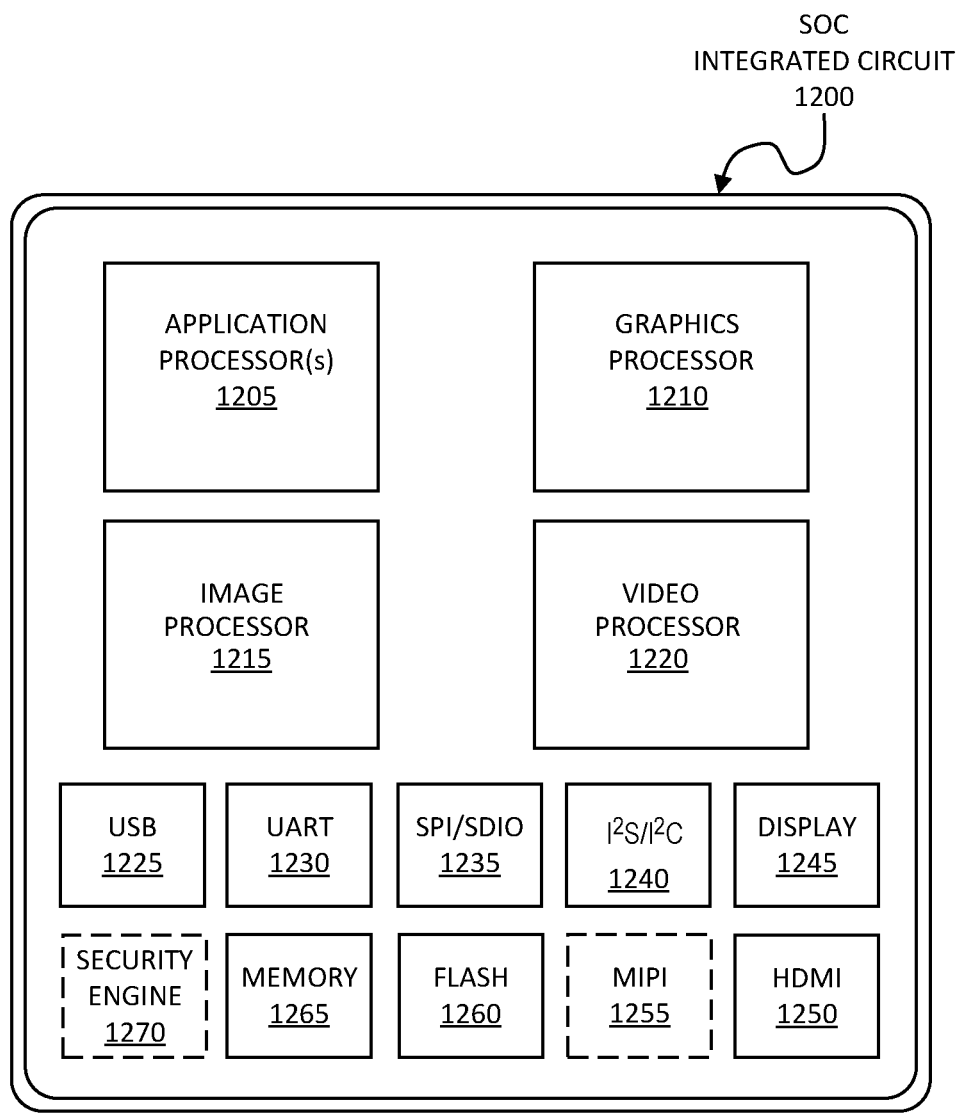
FIG. 31 is a block diagram illustrating an example of a system on a chip integrated circuit according to an embodiment.

FIGS. 31-33 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 31 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 32A:
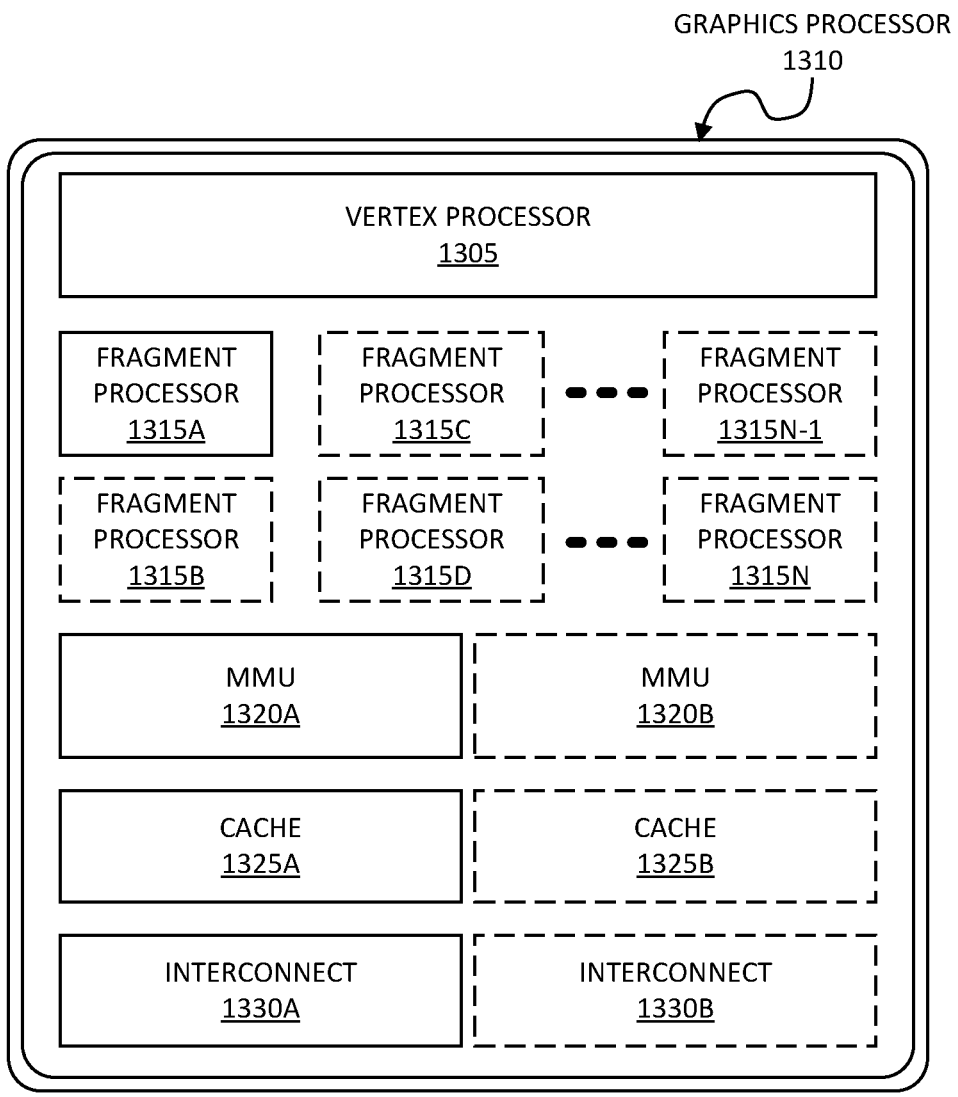
FIGS. 32A to 32B are block diagrams illustrating exemplary graphics processors for use within an SoC, according to embodiments.
Figure 32B:
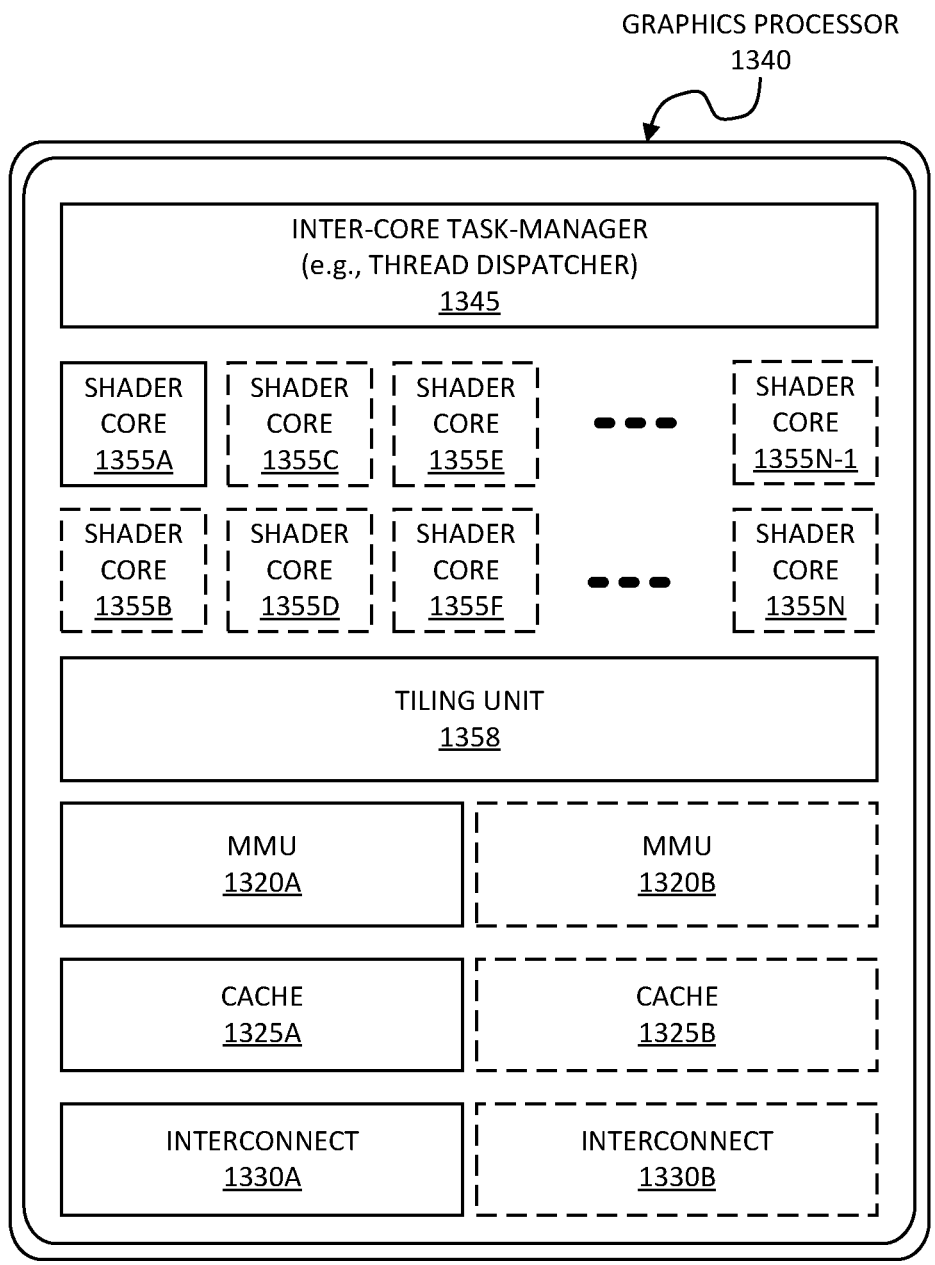

FIGS. 32A-32B are block diagrams illustrating exemplary graphics processors for use within an SoC, according to embodiments described herein. FIG. 32A illustrates an exemplary graphics processor 1310 of a system on a chip integrated circuit that may to be fabricated using one or more IP cores, according to an embodiment. FIG. 32B illustrates an additional exemplary graphics processor 1340 of a system on a chip integrated circuit that may be fabricated using one or more IP cores, according to an embodiment. Graphics processor 1310 of FIG. 32A is an example of a low power graphics processor core. Graphics processor 1340 of FIG. 32B is an example of a higher performance graphics processor core. Each of the graphics processors 1310, 1340 can be variants of the graphics processor 1210 of FIG. 31.

As shown in FIG. 32A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 31, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 32B, graphics processor 1340 includes the one or more MMU(s) 1320A-1320B, caches 1325A-1325B, and circuit interconnects 1330A-1330B of the graphics processor 1310 of FIG. 32A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 33A:
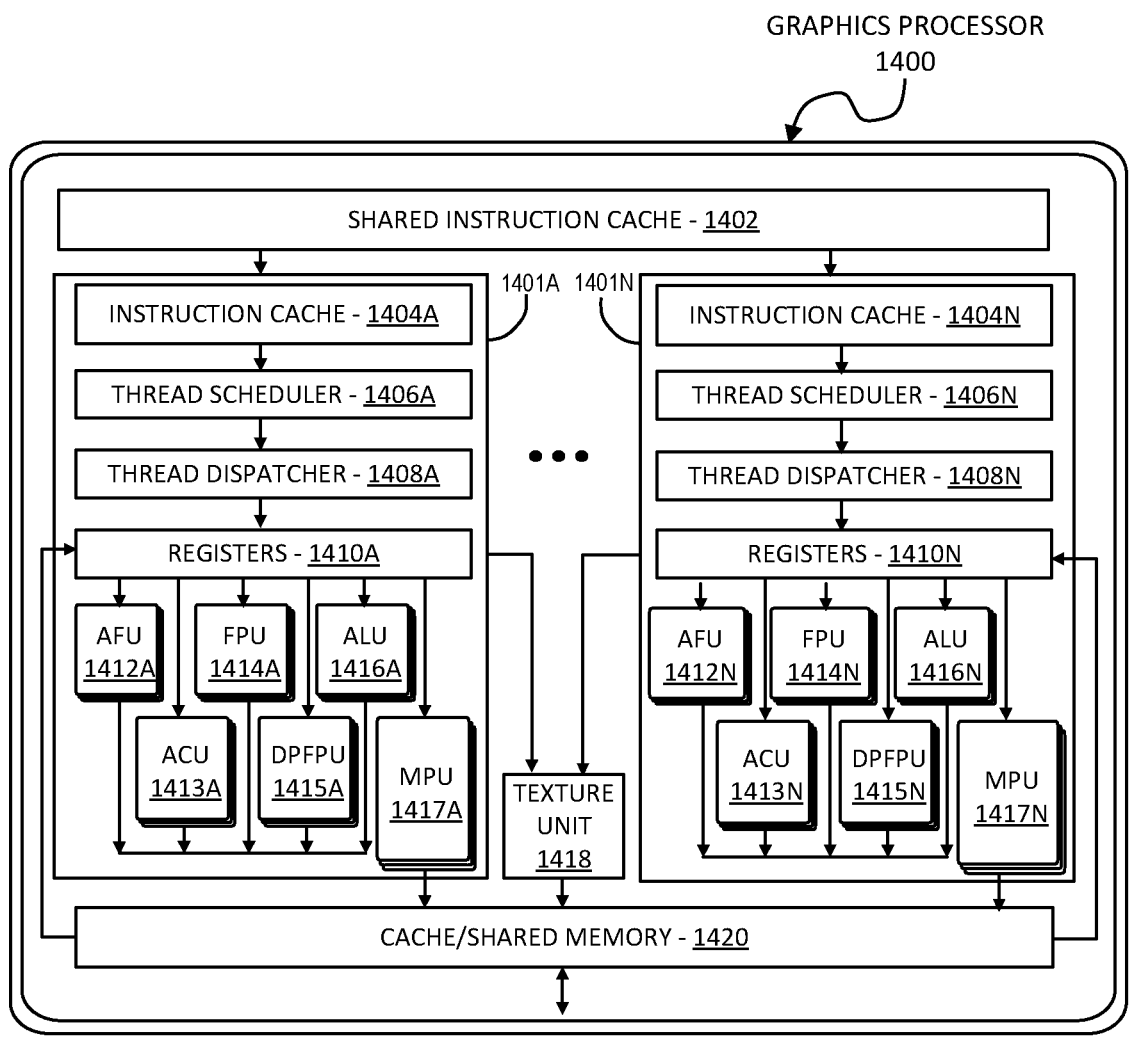
FIGS. 33A to 33B illustrate additional exemplary graphics processor logic according to embodiments.
Figure 33B:
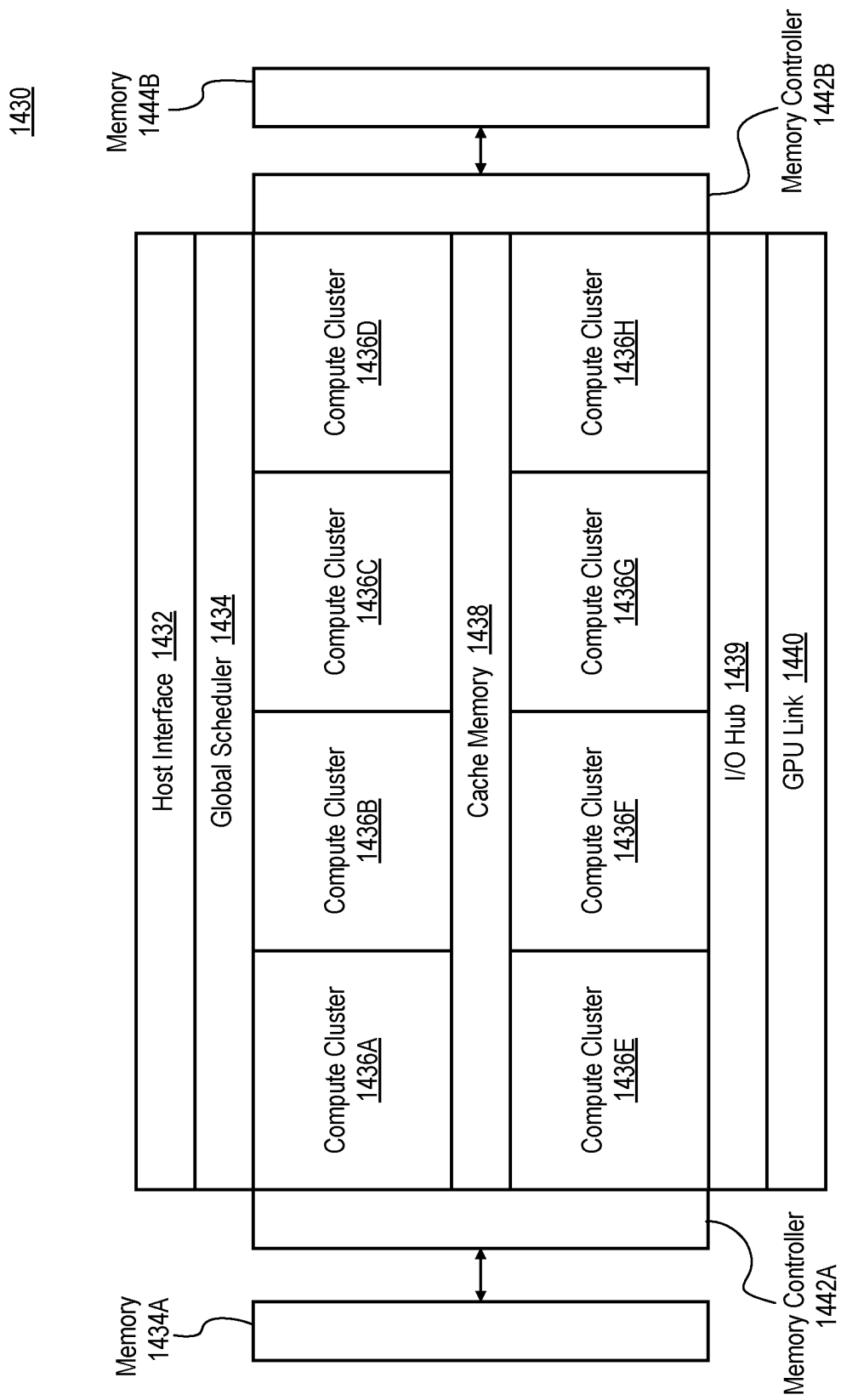

FIGS. 33A-33B illustrate additional exemplary graphics processor logic according to embodiments described herein. FIG. 33A illustrates a graphics core 1400 that may be included within the graphics processor 1210 of FIG. 31, and may be a unified shader core 1355A-1355N as in FIG. 32B. FIG. 33B illustrates a highly-parallel general-purpose graphics processing unit 1430 suitable for deployment on a multi-chip module.

As shown in FIG. 33A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 33B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1434A-1434B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 33A, which can include multiple types of integer and floating point logic units that can perform computational operations at a range of precisions including suited for machine learning computations. For example and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

The various embodiments described above in connection with FIGS. 20 through 33B may be configured to include one or more features or aspects of an adaptive encoder as described herein, including those described in the below Additional Notes and Examples.

Additional Notes and Examples

Example 1 may include an electronic processing system, comprising a processor, memory communicatively coupled to the processor, and logic communicatively coupled to the processor to determine headset-related information including at least one of focus-related information and motion-related information, and determine one or more video encode parameters based on the headset-related information.

Example 2 may include the system of Example 1, wherein the logic is further to adjust a quality parameter for an encode of a macroblock based on the focus-related information.

Example 3 may include the system of Example 2, wherein the logic is further to identify a focus region based on the focus-related information, and adjust the quality parameter for the encode to provide relatively higher quality for macroblocks inside the focus region as compared to macroblocks outside of the focus region.

Example 4 may include the system of Example 1, wherein the logic is further to determine a global motion predictor for an encode of a macroblock based on the motion-related information.

Example 5 may include the system of Example 4, wherein the logic is further to determine a hierarchical motion estimation offset based on a current head position from the motion-related information, a previous head position, and a center point.

Example 6 may include the system of any of Examples 1 to 5, wherein the logic is further to encode a macroblock of a video image based on the one or more determined video encode parameters.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to determine headset-related information including at least one of focus-related information and motion-related information, and determine one or more video encode parameters based on the headset-related information.

Example 8 may include the apparatus of Example 7, wherein the logic is further to adjust a quality parameter for an encode of a macroblock based on the focus-related information.

Example 9 may include the apparatus of Example 8, wherein the logic is further to identify a focus region based on the focus-related information, and adjust the quality parameter for the encode to provide relatively higher quality for macroblocks inside the focus region as compared to macroblocks outside of the focus region.

Example 10 may include the apparatus of Example 7, wherein the logic is further to determine a global motion predictor for an encode of a macroblock based on the motion-related information.

Example 11 may include the apparatus of Example 10, wherein the logic is further to determine a hierarchical motion estimation offset based on a current head position from the motion-related information, a previous head position, and a center point.

Example 12 may include the apparatus of any of Examples 7 to 11, wherein the logic is further to encode a macroblock of a video image based on the one or more determined video encode parameters.

Example 13 may include a method of adaptive encoding, comprising determining headset-related information including at least one of focus-related information and motion-related information, and determining one or more video encode parameters based on the headset-related information.

Example 14 may include the method of Example 13, further comprising adjusting a quality parameter for an encode of a macroblock based on the focus-related information.

Example 15 may include the method of Example 14, further comprising identifying a focus region based on the focus-related information, and adjusting the quality parameter for the encode to provide relatively higher quality for macroblocks inside the focus region as compared to macroblocks outside of the focus region.

Example 16 may include the method of Example 13, further comprising determining a global motion predictor for an encode of a macroblock based on the motion-related information.

Example 17 may include the method of Example 16, further comprising determining a hierarchical motion estimation offset based on a current head position from the motion-related information, a previous head position, and a center point.

Example 18 may include the method of any of Examples 13 to 17, further comprising encoding a macroblock of a video image based on the one or more determined video encode parameters.

Example 19 may include at least one computer readable medium, comprising a set of instructions, which when executed by a computing device, cause the computing device to determine headset-related information including at least one of focus-related information and motion-related information, and determine one or more video encode parameters based on the headset-related information.

Example 20 may include the at least one computer readable medium of Example 19, comprising a further set of instructions, which when executed by the computing device, cause the computing device to adjust a quality parameter for an encode of a macroblock based on the focus-related information.

Example 21 may include the at least one computer readable medium of Example 20, comprising a further set of instructions, which when executed by the computing device, cause the computing device to identify a focus region based on the focus-related information, and adjust the quality parameter for the encode to provide relatively higher quality for macroblocks inside the focus region as compared to macroblocks outside of the focus region.

Example 22 may include the at least one computer readable medium of Example 19, comprising a further set of instructions, which when executed by the computing device, cause the computing device to determine a global motion predictor for an encode of a macroblock based on the motion-related information.

Example 23 may include the at least one computer readable medium of Example 22, comprising a further set of instructions, which when executed by the computing device, cause the computing device to determine a hierarchical motion estimation offset based on a current head position from the motion-related information, a previous head position, and a center point.

Example 24 may include the at least one computer readable medium of any of Examples 19 to 23, comprising a further set of instructions, which when executed by the computing device, cause the computing device to encode a macroblock of a video image based on the one or more determined video encode parameters.

Example 25 may include an adaptive video encoder apparatus, comprising means for determining headset-related information including at least one of focus-related information and motion-related information, and means for determining one or more video encode parameters based on the headset-related information.

Example 26 may include the apparatus of Example 25, further comprising means for adjusting a quality parameter for an encode of a macroblock based on the focus-related information.

Example 27 may include the apparatus of Example 26, further comprising means for identifying a focus region based on the focus-related information, and means for adjusting the quality parameter for the encode to provide relatively higher quality for macroblocks inside the focus region as compared to macroblocks outside of the focus region.

Example 28 may include the apparatus of Example 25, further comprising means for determining a global motion predictor for an encode of a macroblock based on the motion-related information.

Example 29 may include the apparatus of Example 28, further comprising means for determining a hierarchical motion estimation offset based on a current head position from the motion-related information, a previous head position, and a center point.

Example 30 may include the apparatus of any of Examples 25 to 29, further comprising means for encoding a macroblock of a video image based on the one or more determined video encode parameters.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic communicatively coupled to the processor to:
determine headset-related information including at least one of focus-related information and motion-related information,
determine one or more video encode parameters based on the headset-related information,
determine a global motion predictor for an encode of a macroblock based on the motion-related information, and
determine a hierarchical motion estimation offset based on a current head position from the motion-related information, a previous head position, and a center point.

2. The system of claim 1, wherein the logic is further to encode a macroblock of a video image based on the one or more determined video encode parameters.

3. The system of claim 2, wherein the logic is further to:
identify a focus region based on the focus-related information, and
adjust a quality parameter for the encode to provide relatively higher quality for macroblocks inside the focus region as compared to macroblocks outside of the focus region.

4. The system of claim 3, wherein the logic is further to provide successively lower encode quality to regions successively further from the focus area.

5. The system of claim 1, wherein the logic is further to determine motion vector information for a macroblock of a video image based on the global motion predictor.

6. The system of claim 5, wherein the logic is further to encode the macroblock of the video image based on the one or more determined video encode parameters.

7. A semiconductor package apparatus, comprising:
a substrate; and
logic coupled to the substrate, wherein the logic is at least partly implemented in one or more of configurable logic and fixed-functionality hardware logic, the logic coupled to the substrate to:
determine headset-related information including at least one of focus-related information and motion-related information,
determine one or more video encode parameters based on the headset-related information,
determine a global motion predictor for an encode of a macroblock based on the motion-related information, and
determine a hierarchical motion estimation offset based on a current head position from the motion-related information, a previous head position, and a center point.

8. The apparatus of claim 7, wherein the logic is further to encode a macroblock of a video image based on the one or more determined video encode parameters.

9. The apparatus of claim 8, wherein the logic is further to:
identify a focus region based on the focus-related information, and
adjust a quality parameter for the encode to provide relatively higher quality for macroblocks inside the focus region as compared to macroblocks outside of the focus region.

10. The apparatus of claim 9, wherein the logic is further to provide successively lower encode quality to regions successively further from the focus area.

11. The apparatus of claim 7, wherein the logic is further to determine motion vector information for a macroblock of a video image based on the global motion predictor.

12. The apparatus of claim 11, wherein the logic is further to encode the macroblock of the video image based on the one or more determined video encode parameters.

13. At least one computer readable medium, comprising a set of instructions which, when executed by a computing device, cause the computing device to:
determine headset-related information including at least one of focus-related information and motion-related information;
determine one or more video encode parameters based on the headset-related information;
determine a global motion predictor for an encode of a macroblock based on the motion-related information; and
determine a hierarchical motion estimation offset based on a current head position from the motion-related information, a previous head position, and a center point.

14. The at least one computer readable medium of claim 13, comprising a further set of instructions which, when executed by the computing device, cause the computing device to encode a macroblock of a video image based on the one or more determined video encode parameters.

15. The at least one computer readable medium of claim 14, comprising a further set of instructions which, when executed by the computing device, cause the computing device to:
identify a focus region based on the focus-related information, and
adjust a quality parameter for the encode to provide relatively higher quality for macroblocks inside the focus region as compared to macroblocks outside of the focus region.

16. The at least one computer readable medium of claim 15, comprising a further set of instructions which, when executed by the computing device, cause the computing device to provide successively lower encode quality to regions successively further from the focus area.

17. The at least one computer readable medium of claim 13, comprising a further set of instructions which, when executed by the computing device, cause the computing device to determine motion vector information for a macroblock of a video image based on the global motion predictor.

18. The at least one computer readable medium of claim 17, comprising a further set of instructions which, when executed by the computing device, cause the computing device to encode the macroblock of the video image based on the one or more determined video encode parameters.

19. A method of adaptive encoding, comprising:
- determining headset-related information including at least one of focus-related information and motion-related information;
- determining one or more video encode parameters based on the headset-related information;
- determining a global motion predictor for an encode of a macroblock based on the motion-related information; and
- determining a hierarchical motion estimation offset based on a current head position from the motion-related information, a previous head position, and a center point.

20. The method of claim 19, further comprising encoding a macroblock of a video image based on the one or more determined video encode parameters.

21. The method of claim 20, further comprising:
- identifying a focus region based on the focus-related information, and
- adjusting a quality parameter for the encode to provide relatively higher quality for macroblocks inside the focus region as compared to macroblocks outside of the focus region.

22. The method of claim 21, further comprising providing successively lower encode quality to regions successively further from the focus area.

23. The method of claim 19, further comprising determining motion vector information for a macroblock of a video image based on the global motion predictor.

24. The method of claim 23, further comprising encoding the macroblock of the video image based on the one or more determined video encode parameters.

* * * * *